US012676029B2

(12) United States Patent
 Ebrahimi et al.

(10) Patent No.: US 12,676,029 B2
(45) Date of Patent: Jul. 7, 2026

(54) SYSTEMS AND METHODS FOR IDENTIFYING ADVANCED DRIVER ASSISTANCE SYSTEMS USING VEHICLE DIAGNOSTICS

(71) Applicant: Protech Electronics LLC, Lewisville, TX (US)

(72) Inventors: Hami Ebrahimi, Dallas, TX (US); Jesus Gutierrez, Highland Village, TX (US)

(73) Assignee: PROTECH ELECTRONICS LLC, Lewisville, TX (US)

( * ) Notice: Subject to any disclaimer, the term of this patent is extended or adjusted under 35 U.S.C. 154(b) by 442 days.

(21) Appl. No.: 17/902,857

(22) Filed: Sep. 4, 2022

(65) Prior Publication Data

US 2023/0083255 A1 Mar. 16, 2023

Related U.S. Application Data

(60) Provisional application No. 63/240,559, filed on Sep. 3, 2021.

(51) Int. Cl.
 *G07C 5/00* (2006.01)
 *G06F 40/40* (2020.01)
 (Continued)

(52) U.S. Cl.
 CPC ............. *G07C 5/006* (2013.01); *G06F 40/40* (2020.01); *G06N 3/04* (2013.01); *G07C 5/0808* (2013.01);
 (Continued)

(58) Field of Classification Search
 CPC .. G07C 5/006; G07C 5/0808; G07C 2205/02; G06F 40/40; G06N 3/045; G06N 3/08; G06N 5/025
 See application file for complete search history.

(56) References Cited

U.S. PATENT DOCUMENTS 9,672,497 B1 * 6/2017 Lewis ................... G06F 40/284
11,775,943 B2 10/2023 Balan
(Continued)

FOREIGN PATENT DOCUMENTS

WO 2020244081 12/2020
WO WO-2020244081 A1 * 12/2020 ............... G06N 7/01

OTHER PUBLICATIONS

International Search Report and Written Opinion of the International Searching Authority in PCT/US2022/42568 dated Feb. 3, 2023.

*Primary Examiner* — Kito R Robinson
*Assistant Examiner* — Zachary E. F. Glade
(74) *Attorney, Agent, or Firm* — STEPTOE LLP; Carl B. Wischhusen

(57) ABSTRACT

Systems, methods, and apparatuses are provided for evaluating the calibration requirements or calibration needs of one or more sensors of a vehicle. A subject matter expert and/or a machine learning model can be used to generate correlations between data scanned from a vehicle and from repair orders or repair estimates. Natural language processing can be used to evaluate information contained in a repair order to generate a CIECA or line code. The machine learning model can use rules when a diagnostic trouble code (DTC) provides a high probability indication that a particular component requires repair. In some examples, a machine learning model can cluster or otherwise identify a likely area of repair based on information embedded or contained in a repair estimate.

20 Claims, 29 Drawing Sheets

(51) Int. Cl.
  *G06N 3/04*      (2023.01)
  *G06N 3/045*     (2023.01)
  *G06N 3/08*      (2023.01)
  *G06N 5/025*     (2023.01)
  *G07C 5/08*      (2006.01)

(52) U.S. Cl.
  CPC .............. *G06N 3/045* (2023.01); *G06N 3/08* (2013.01); *G06N 5/025* (2013.01); *G07C 2205/02* (2013.01)

(56)              References Cited

U.S. PATENT DOCUMENTS

| | | | |
|---|---|---|---|
| 2009/0299900 | A1 | 12/2009 | Chen |
| 2010/0229044 | A1* | 9/2010 | Fountain ............... G01M 17/00 |
| | | | 714/E11.029 |
| 2015/0012169 | A1 | 1/2015 | Coard |
| 2016/0071334 | A1* | 3/2016 | Johnson .............. G07C 5/0808 |
| | | | 701/29.1 |
| 2017/0092018 | A1* | 3/2017 | Throop ................. G07C 5/008 |
| 2020/0334927 | A1* | 10/2020 | Rozint ............... B60R 21/0136 |
| 2021/0240556 | A1* | 8/2021 | Breen .................... G06Q 40/08 |
| 2021/0271962 | A1* | 9/2021 | Abhishek ................ G06N 3/09 |
| 2021/0304522 | A1* | 9/2021 | Balan .................... G06V 20/56 |

* cited by examiner

| Generic Acronym | Full System Name | Definition |
|---|---|---|
| (ACC 1) | Adaptive Cruise Control (1) | ANY intelligent cruise control that uses ONLY front radar(s) to operate |
| (ACC 2) | Adaptive Cruise Control (2) | ANY intelligent cruise control that uses BOTH the windshield camera and front radar(s) to operate |
| (ACC 3) | Adaptive Cruise Control (3) | ANY intelligent cruise control that uses ONLY the windshield camera to operate |
| (AEB 1) | Automatic Emergency Braking (1) | ANY collision mitigation that uses ONLY front radar(s) to operate |
| (AEB 2) | Automatic Emergency Braking (2) | ANY collision mitigation that uses BOTH the windshield camera and front radar(s) to operate |
| (AEB 3) | Automatic Emergency Braking (3) | ANY collision mitigation that uses ONLY the windshield camera to operate |
| (AHL) | Adaptive Head Lamps | ANY front lighting systems that adapts to the direction of travel as the steering is moved |
| (APA) | Active Parking Assistance | ALL parking aid bumper sensors (front and/or back) that REQUIRE calibration |
| (BSW-RCTW 1) | Blind Spot Warning/Rear Cross Traffic Warning (1) | ANY side monitoring system located in the rear of the vehicle |
| (BSW-RCTW 2) | Blind Spot Warning/Rear Cross Traffic Warning (2) | BSW-RCTW that are housed in the rear taillights |
| (BSW-RCTW 3) | Blind Spot Warning/Rear Cross Traffic Warning (3) | BSW-RCTW that is operated through rearview camera |
| (BUC) | Backup Camera | ANY parking aid camera system that ONLY includes the rear camera |
| (LKA 1) | Lane Keeping Assistance | ANY front windshield camera system that alerts/assists with keeping the vehicle in the driving lane(s) |
| (LKA 2) | Lane Keeping Assistance | ANY system that alerts/assists with keeping the vehicle in the driving lane(s) that uses the REAR camera to operate (Honda Specific) Passenger Mirror Camera |
| (LW) | LaneWatch | |
| (NV) | Night Vision | Night Vision Camera systems |
| (SVC) | Surround View Camera | ANY multi-camera parking aid system |

FIG. 2B

| | A | B | C | D |
|---|---|---|---|---|
| | dtcCode ▾ | dtcDescription ▾ | dtcSys ▾ | CarMake ▾ |
| 1 | | | | |
| 2 | 62 | Millimeter wave radar sensor error | ACC | Acura |
| 3 | 62 | Millimeter wave radar sensor error | ACC | Acura |
| 4 | 83 | Millimeter wave radar detection unstable | ACC | Acura |
| 5 | 84 | Target vehicle comes closer than the millimeter wave radar detecting limits | ACC | Acura |
| 6 | 88 | Millimeter wave radar out of detection area | ACC | Acura |
| 7 | 62 | Millimeter wave radar sensor error | CMBS (CMS) | Acura |
| 8 | 62 | Millimeter wave radar sensor error | CMBS (CMS) | Acura |
| 9 | 88 | Millimeter wave radar out of detection area | CMBS (CMS) | Acura |
| 10 | 10 | Incomplete static camera aiming with LKAS camera | LKAS camera ecu | Acura |
| 11 | 234 | Sensor for adaptive cruise control misadjusted | 13-Adaptive Cruise Control | Audi |
| 12 | 1044 | Control module incorrectly coded | 13-Adaptive Cruise Control | Audi |
| 13 | B10E7F0 | Cruise Control Front Distance Range Sensor separated | 13-Adaptive Cruise Control | Audi |
| 14 | B200000 | Ctrl. module faulty | 13-Adaptive Cruise Control | Audi |
| 15 | B2DDFF0 | Internal malfunction | 13-Adaptive Cruise Control | Audi |

| | A | B | C | D | E |
|---|---|---|---|---|---|
| | 271 | 272 | 273 | 274 | 275 |
| 1 | Generic System ▼ | Code ▼ | Description ▼ | ▼ Code ▼ | Category Name ▼ |
| 2 | ACC (1) | BUAB_F | Bumper - Bumper Cover Assembly, Front | BU | Bumper |
| 3 | ACC (1) | BUAT_F | Bumper - Attachments, Front | BU | Bumper |
| 4 | ACC (1) | BUBA_F | Bumper - Bumper Assembly, Front | BU | Bumper |
| 5 | ACC (1) | BUBC_F | Bumper - Bumper Cover, Front | BU | Bumper |
| 6 | ACC (1) | BUBG | Bumper - Bumper and Grille, One Piece | BU | Bumper |
| 7 | ACC (1) | BUBG_F | Bumper - Bumper and Grills, Front | BU | Bumper |
| 8 | ACC (1) | BUEA_F | Bumper - Absorbers, Front | BU | Bumper |
| 9 | ACC (1) | BUFP_F | Bumper - Bumper Filler Panel, Front | BU | Bumper |
| 10 | ACC (1) | BUFR_F | Bumper - Bumper Frame, Front | BU | Bumper |
| 11 | ACC (1) | BUGR_F | Bumper - Bumper Grille, Front | BU | Bumper |
| 12 | ACC (1) | BUHW_F | Bumper - Mounting Hardware, Front | BU | Bumper |
| 13 | ACC (1) | BULC_F | Bumper - Lower Bumper Cover, Front | BU | Bumper |
| 14 | ACC (1) | BUOH_F | Bumper - Overhaul, Front | BU | Bumper |
| 15 | ACC (1) | BURF_F | Bumper - Bumper Cover Reinforcement, Front | BU | Bumper |
| 16 | ACC (1) | FEASL | Front End - Grille Panel Assembly, Left | FE | Front End |
| 17 | ACC (1) | FEASR | Front End - Grille Panel Assembly, Right | FE | Front End |

FIG. 2D

| System | When to Aim | Notes |
|---|---|---|
| | Windshield was removed and installed. | |
| | Windshield was replaced. | The replacement windshield must be a Honda genuine replacement windshield. Installing an aftermarket windshield will cause the aiming to fail or abnormal operation of the driving support system. |
| | Multipurpose camera unit or FCW/LDW camera unit was removed and installed. | |
| | Multipurpose camera unit or FCW/LDW camera unit was replaced. | Always order a new replacement camera unit using the VIN. |
| | After a collision repair requiring a structural body repair. | Structural damage include any damage beyond minor cosmetic abrasions to the welded, riveted, or bonded parts of the main unibody as well as the bumper reinforcements, door intrusion beams, or bolt-on front bulkheads. |
| Multipurpose Camera or FCW/LDW Camera | After a Supplemental Restraint System (SRS) deployment. | |
| | If the following DTCs are set:<br><br>Multipurpose Camera Unit<br><br>• B2A60-52 (dynamic camera aiming incomplete)<br><br>• B2A60-54 (static camera aiming incomplete)<br><br>FCW/LDW Camera Unit<br><br>• B2A60-54 (FCW/LDW camera unit aiming incomplete)<br><br>• B2A60-54 (FCW/LDW camera unit aiming incomplete) | • You must follow the DTC troubleshooting procedure first, and only do the aiming procedure when instructed.<br><br>• Other DTCs indicated must be corrected prior to aiming; otherwise, the aiming may fail. |

Data processing

520

Elimination of Duplicates

530

Inputting Missing Line Codes

540

Aggregate additional data for additional dataset

550

Generate variables for outcomes

560

Generate Features from input data

570

Train the model (e.g., using binary-logistic regression)

700

710

Use scan tool on interface port of vehicle

720

Organize and Format Data

730

Obtain additional vehicle specific information

740

Obtain list of electronic modules equipped with ADAS

750

Rank or prioritize list of DTC codes for specific
vehicle model

800

810
Standardize vehicle components through use of CIECA codes

820
Generate or write an estimate into collision estimating software

830
Use CEICA codes to outline an area of repair and/or type of repair

840
Identify specific ADAS component needing calibration

850
Obtain CEICA codes

900

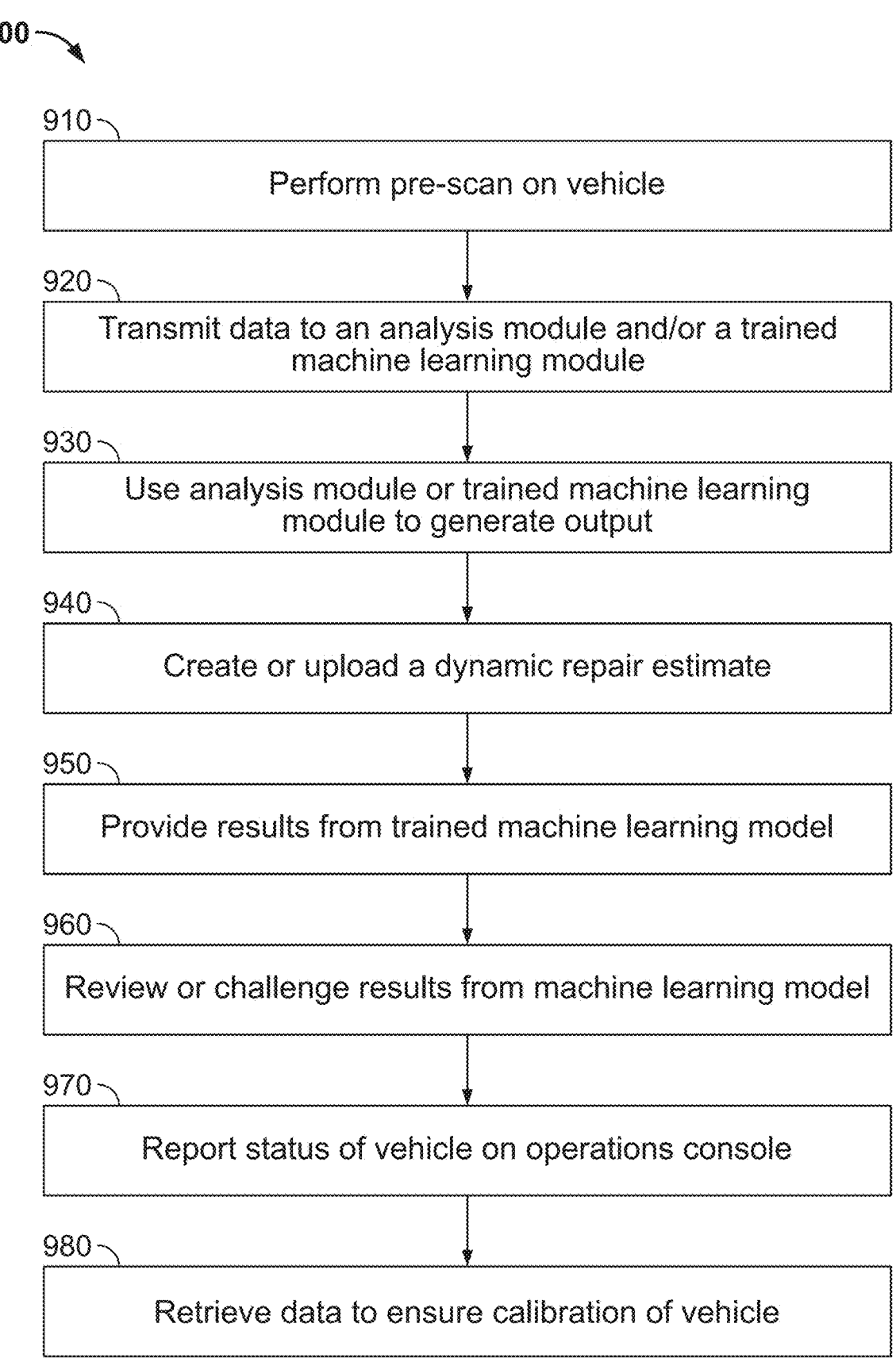

910

Perform pre-scan on vehicle

920

Transmit data to an analysis module and/or a trained machine learning module

930

Use analysis module or trained machine learning module to generate output

940

Create or upload a dynamic repair estimate

950

Provide results from trained machine learning model

960

Review or challenge results from machine learning model

970

Report status of vehicle on operations console

980

Retrieve data to ensure calibration of vehicle

FIG. 9

Areas of Damage or Repair
from Accident

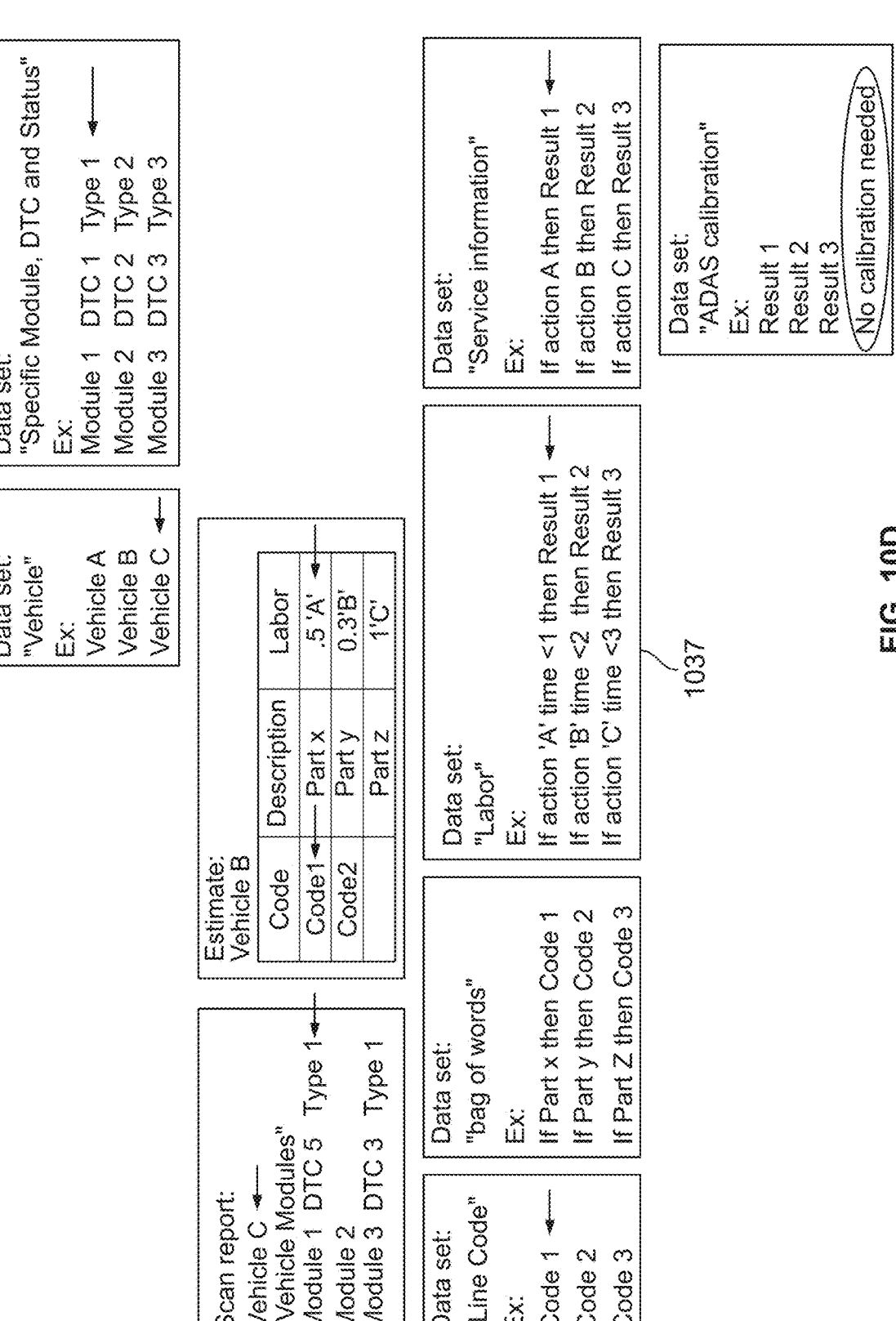

Vehicle C + Module 3 + Code 1 + .5 → No Calibration Needed

Data set:
"Specific Module, DTC and Status"
Ex:
Module 1  DTC 1  Type 1
Module 2  DTC 2  Type 2
Module 3  DTC 3  Type 3

Data set:
"Vehicle"
Ex:
Vehicle A
Vehicle B
Vehicle C →

Data set:
"Service information"
Ex:
If action A then Result 1
If action B then Result 2
If action C then Result 3

Data set:
"ADAS calibration"
Ex:
Result 1
Result 2
Result 3
No calibration needed Estimate:
Vehicle B

| Code | Description | Labor |
|------|-------------|-------|
| Code1 | Part x | .5 'A' |
| Code2 | Part y | 0.3'B' |
|      | Part z | 1'C' |

Data set:
"Labor"
Ex:
If action 'A' time <1 then Result 1
If action 'B' time <2 then Result 2
If action 'C' time <3 then Result 3

1037

Scan report:
Vehicle C
"Vehicle Modules"
Module 1 DTC 5  Type 1
Module 2
Module 3 DTC 3  Type 1

Data set:
"bag of words"
Ex:
If Part x then Code 1
If Part y then Code 2
If Part Z then Code 3

Data set:
"Line Code"
Ex:
Code 1
Code 2
Code 3

FIG. 10D

Vehicle C + Module 3 + (Part z) Code 3 ⟶ 80% chance of Result 3

Part z (ex. Estimate only contained "bumper") = Code X? = Code 3 or Code 4 (ex. front or rear bumper?)

Part k = spoiler = weighted information 80% chance "rear bumper"
Part h = paint = weighted information 5%

80% chance Part z = Code 3 ⟶ (this will be picked for the decision)
5% chance Part L = Code 4

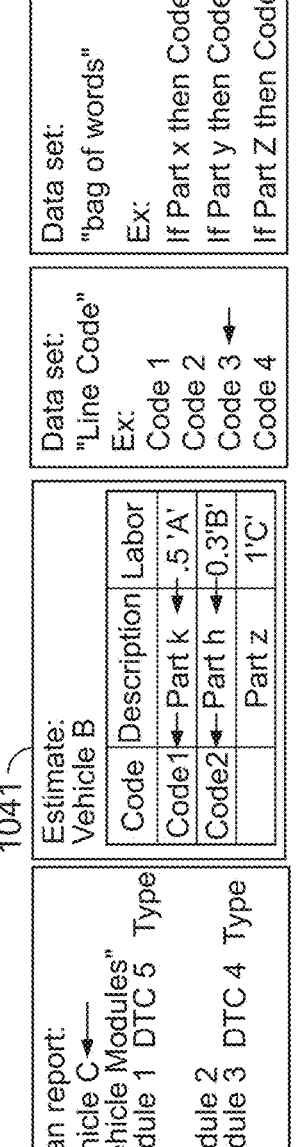

Estimate:
Vehicle B

1041

| Code | Description | Labor |
|------|-------------|-------|
| Code1 | Part k | .5 'A' |
| Code2 | Part h | 0.3'B' |
|       | Part z | 1'C' |

Scan report:
Vehicle C
"Vehicle Modules"
Module 1  DTC 5  Type
1
Module 2
Module 3  DTC 4  Type
1

Data set:
"Line Code"
Ex:
Code 1
Code 2
Code 3
Code 4

Data set:
"bag of words"
Ex:
If Part x then Code 1
If Part y then Code 2
If Part Z then Code 3

Data set:
"Labor"
Ex:
If action 'A' time <1
  then Result 1
If action 'B' time <2
  then Result 2
If action 'C' time <3
  then Result 3

Data set:
"ADAS calibration"
Ex:
Result 1
Result 2
Result 3

Data set:
"Service information"
Ex:
If action A then Result 1
If action B then Result 2
If action C then Result 3

Data set:
"Specific Module, DTC and Status"
Ex:
Module 1  DTC 1  Type 1
Module 2  DTC 2  Type 2
Module 3  DTC 3  Type 3

Data set:
"Vehicle"
Ex:
Vehicle A
Vehicle B
Vehicle C

FIG. 10E

Data set:
"Labor"
Ex:
If action 'A' time <1 then Result 1
If action 'B' time <2 then Result 2
If action 'C' time <3 then Result 3

Data set:
"Service information"
Ex:
If action A then Result 1
If action B then Result 2
If action C then Result 3

Data set:
"ADAS calibration"
Ex:
Result 1
Result 2
Result 3

| Confirmed/Verified | Learn | Updated Mapped Data/Correlations |
|---|---|---|
| Correct | | Vehicle C + Module 3 + Code 1 + .5 = No Calibration needed |
| Correct | | Vehicle A +Module 1 + DTC 1 + Type 3 = Result 1 - |
| Correct | | Vehicle B + Module 2 + Code 2 + = Result 1 |
| Correct | | Vehicle B + Module 2 + (Part z) Code 3 + = Result 3 |
| Correct | | Vehicle C + Module 4 + Code 1 + .5 = No Calibration needed |
| Correct | | Vehicle B + Module 2 + Code 2 + = Result 1 |
| Correct | | Vehicle B + Module 2 + (Part z) Code 3 + = Result 3 |
| Correct | | Vehicle C + Module 3 + Code 1 + Labor 3 = Result 2 |
| Correct | | Vehicle A +Module 1 + DTC 1 + Type 2 = Result 1 |
| Fail (e.g. false positive) | Remove from Map Data | Vehicle B + Module 2 + Code 2 + = Result 3 |
| Fail | Remove from Map Data | Vehicle B + Module 2 + (Part z) Code 4 + = Result 3 |
| Fail | Remove from Map Data | |
| Add | Result 1 | Vehicle C + Module 3 + Code 1 + .5 = Result 1 |
| Add | Only up to year 2021 | >2022 Vehicle A +Module 1 + DTC 1 + Type 1 = Result 1 |
| incorrect | Not used | |

| | | | | | | | |
|---|---|---|---|---|---|---|---|
| 16 | E01 | Remove/Replace | RT Fender liner clip #2 | | | | |
| 17 | E01 | Remove/Replace | RT Protector | 2 | 12.52T | OEM | 0.0 Body |
| 18 | E01 | Remove/Install | RT Mud guard | | 60.71T | OEM | 0.2 Body |
| 19 | E01 | Remove/Replace | RT Molding w/o XSE gray | 1 | | OEM | 0.0 Body |
| 20 | E01 | Remove/Install | RT Wheel opng mldg | | 71.54T | | 0.0 Body |
| 21 | E01 | Remove/Install | LT Wheel opng mldg - PARTIAL | 1 | | | 0.0 Body |
| | | | NOTE: loosen for bumper removal | | | | |

1311   1312   1313   1314   1315

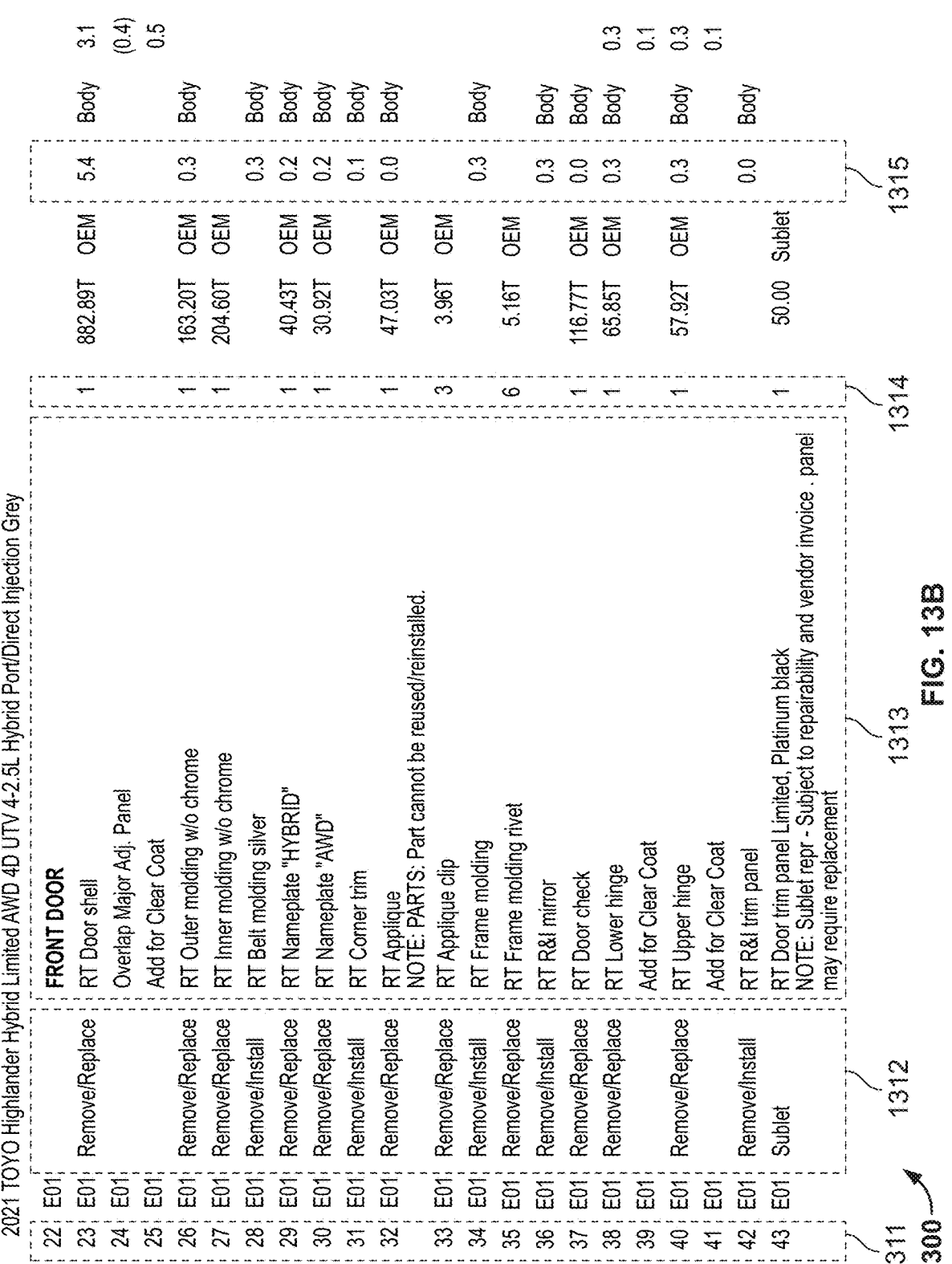

2021 TOYO Highlander Hybrid Limited AWD 4D UTV 4-2.5L Hybrid Port/Direct Injection Grey

| # | | Operation | Description | Qty | Price | | Labor | | Refinish |
|---|---|---|---|---|---|---|---|---|---|
| 22 | E01 | | FRONT DOOR | | | | | | |
| 23 | E01 | Remove/Replace | RT Door shell | 1 | 882.89T | OEM | 5.4 | Body | 3.1 |
| 24 | E01 | | Overlap Major Adj. Panel | | | | | | (0.4) |
| 25 | E01 | | Add for Clear Coat | | | | | | 0.5 |
| 26 | E01 | Remove/Replace | RT Outer molding w/o chrome | 1 | 163.20T | OEM | 0.3 | Body | |
| 27 | E01 | Remove/Replace | RT Inner molding w/o chrome | 1 | 204.60T | OEM | | | |
| 28 | E01 | Remove/Install | RT Belt molding silver | 1 | 40.43T | OEM | 0.3 | Body | |
| 29 | E01 | Remove/Replace | RT Nameplate "HYBRID" | 1 | 30.92T | OEM | 0.2 | Body | |
| 30 | E01 | Remove/Replace | RT Nameplate "AWD" | 1 | | OEM | 0.2 | Body | |
| 31 | E01 | Remove/Install | RT Corner trim | 1 | | OEM | 0.1 | Body | |
| 32 | E01 | Remove/Replace | RT Applique | 1 | 47.03T | OEM | 0.0 | Body | |
| | | | NOTE: PARTS: Part cannot be reused/reinstalled. | | | | | | |
| 33 | E01 | Remove/Replace | RT Applique clip | 3 | 3.96T | OEM | | | |
| 34 | E01 | Remove/Install | RT Frame molding | | | | 0.3 | Body | |
| 35 | E01 | Remove/Replace | RT Frame molding rivet | 6 | 5.16T | OEM | | | |
| 36 | E01 | Remove/Install | RT R&I mirror | | | | 0.3 | Body | |
| 37 | E01 | Remove/Replace | RT Door check | 1 | 116.77T | OEM | 0.0 | Body | |
| 38 | E01 | Remove/Replace | RT Lower hinge | 1 | 65.85T | OEM | 0.3 | Body | 0.3 |
| 39 | E01 | | Add for Clear Coat | | | | | | 0.1 |
| 40 | E01 | Remove/Replace | RT Upper hinge | 1 | 57.92T | OEM | 0.3 | Body | 0.3 |
| 41 | E01 | | Add for Clear Coat | | | | | | 0.1 |
| 42 | E01 | Remove/Install | RT R&I trim panel | | | | 0.0 | Body | |
| 43 | E01 | Sublet | RT Door trim panel Limited, Platinum black | 1 | 50.00 | Sublet | | | |
| | | | NOTE: Sublet repr - Subject to repairability and vendor invoice . panel may require replacement | | | | | | |

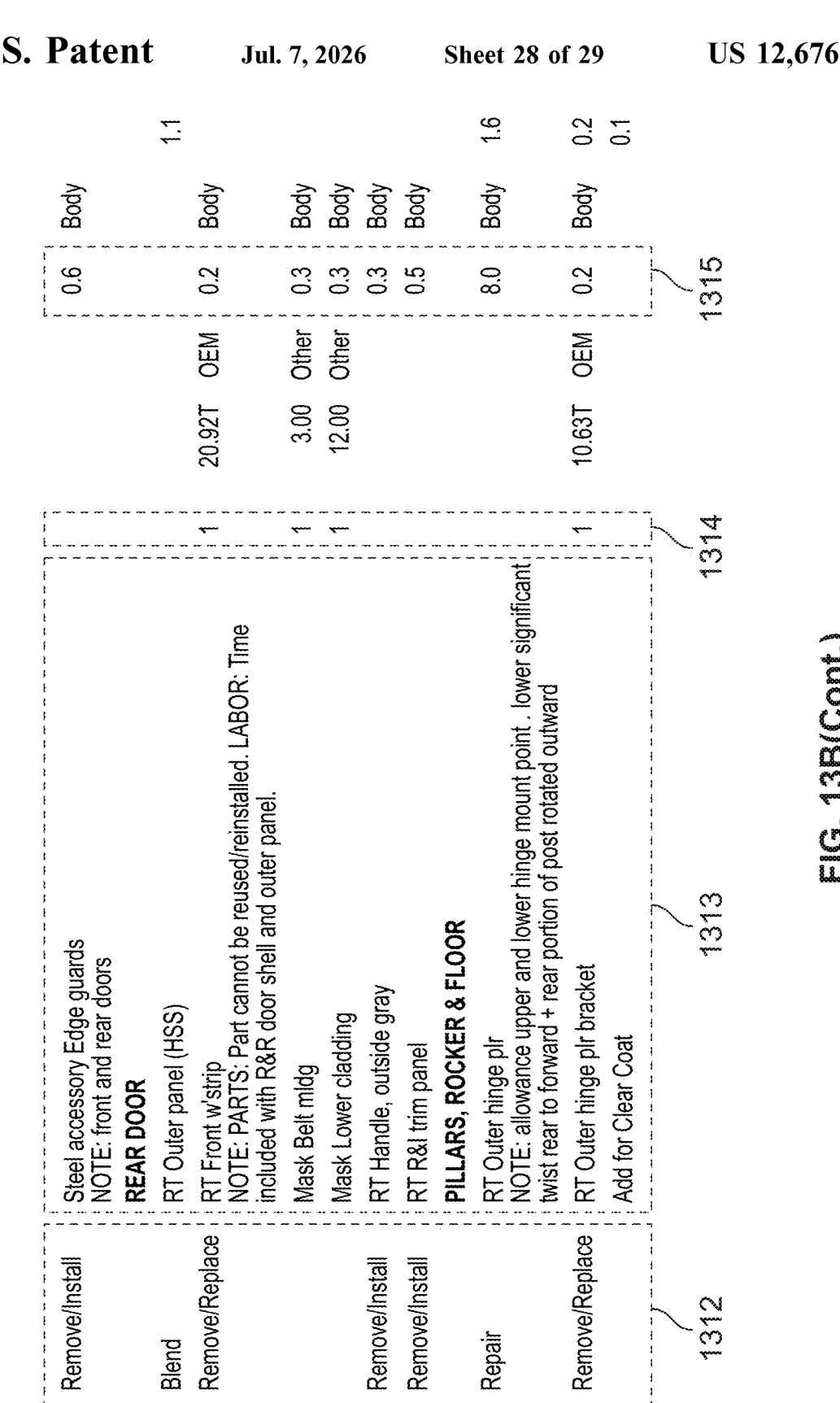

| | | | | | | |
|---|---|---|---|---|---|---|
| 44 | E01 | Remove/Install | Steel accessory Edge guards | | | 0.6 | Body | |
| 45 | E01 | | NOTE: front and rear doors | | | |
| 46 | E01 | Blend | REAR DOOR | | | 1.1 | Body |
| 47 | E01 | Remove/Replace | RT Outer panel (HSS) | 1 | 20.92T | OEM | 0.2 | Body |
| | E01 | | RT Front w'strip | | | |
| | | | NOTE: PARTS: Part cannot be reused/reinstalled. LABOR: Time included with R&R door shell and outer panel. | | | |
| 48 | E01 | | Mask Belt mldg | 1 | 3.00 | Other | 0.3 | Body |
| 49 | E01 | | Mask Lower cladding | 1 | 12.00 | Other | 0.3 | Body |
| 50 | E01 | Remove/Install | RT Handle, outside gray | | | 0.3 | Body |
| 51 | E01 | Remove/Install | RT R&I trim panel | | | 0.5 | Body |
| 52 | E01 | | PILLARS, ROCKER & FLOOR | | | |
| 53 | E01 | Repair | RT Outer hinge plr | | | 8.0 | Body | 1.6 |
| | E01 | | NOTE: allowance upper and lower hinge mount point . lower significant twist rear to forward + rear portion of post rotated outward | | | |
| 54 | E01 | Remove/Replace | RT Outer hinge plr bracket | 1 | 10.63T | OEM | 0.2 | Body | 0.2 |
| 55 | E01 | | Add for Clear Coat | | | 0.1 |

| Center Name | RO | Calibration Requirements | Vehicle |
|---|---|---|---|
| San Antonio - Foster Rd | 692003576 | Refer to Pre-Scan | 2016 NISS Rogue S FWD |
| San Antonio - Foster Rd | 692003626 | ✓ | 2018 NISS Sentra SV w/Continuo |
| San Antonio - Foster Rd | 692003559 | Refer to Pre-Scan | 2015 NISS Altima S |
| San Antonio - Foster Rd | 692003625 | ✕ | 2018 HYUN Tucson Limited FWD |
| San Antonio - Foster Rd | 692003607 | Refer to Pre-Scan | 2010 HOND Pilot Touring w/Navi |
| San Antonio - Foster Rd | 692003588 | No Cal Req | 2015 LEXU IS 250 RWD |

SYSTEMS AND METHODS FOR IDENTIFYING ADVANCED DRIVER ASSISTANCE SYSTEMS USING VEHICLE DIAGNOSTICS

CROSS-REFERENCE TO RELATED APPLICATIONS

This application claims the benefit of U.S. provisional patent application No. 63/240,559 that was filed on Sep. 3, 2021 entitled "System and Method for Identifying Advanced Driver Assist Systems for Vehicles", the entire disclosure of which is hereby incorporated by reference.

BACKGROUND

Millions of vehicles are repaired each year. During a collision, various vehicle components, such as sensors and safety systems, including cameras, infra-red systems, ultrasound systems can be damaged, and require repair. Additional sensors systems can include radar units and LIDAR units for example. At times, these sensor and safety systems may be configured to work with one another. After a collision, while the vehicle component may be repaired, a component or sensor may require calibration to operate correctly or as otherwise designed. Mis-calibration of the component may cause the system to perform incorrectly during actual operation of the device. For instance, a camera which is mis-calibrated can cause keep car safety systems, such as lane following systems or lane departure systems, to operate incorrectly.

Currently only about 4% of vehicles that need to be calibrated are identified through manual processes. The current process to determine whether a car needs to be calibrated after a repair is a very manual process and is based on many different data sets that relies on human judgment. The cost of calibration can be expensive and slow as a service worker has to consider, for example, scanned car data, service recommendations by OEM, and any modifications to the original vehicle. Further, as vehicles become more complex, identification of the specific sensor(s) or component(s) requiring calibration or causing an error code becomes increasingly difficult.

Other methods of identifying vehicle sensors for calibration depend on detailed "build data" or "parts data" which rely on specific information about the parts used to build a car. In these methods, a vehicle identification number (VIN) or other identifier can be obtained to determine the make, model, and from that information, the specific parts used to build a particular vehicle. This in turn can allow for error codes or other data from that vehicle to be used to identify which sensors may need calibration.

However, obtaining such build or parts data is not always feasible as the data is often proprietary. Further, such methods cannot be generalized or used on vehicles where part data is not available or is not shared by a manufacturer of the vehicle. In some examples, the parts build data for a particular VIN may not align with the vehicle as manufactured, leading to a mismatch between live data obtained from the vehicle and data provided from parts build data for that vehicle. For instance, a module which is present in the build data may in fact be missing on the vehicle as built. In addition, the use of the parts build data requires manual identification by a human operator of which sensor or group of sensors, and related electronic modules, from the parts used to manufacturer a vehicle are associated with an Advanced driver-assistance system (ADAS).

On the other hand, vehicle sensor information can be obtained from a data port on a vehicle and allow for the identification of sensors, modules, or systems, actually present on the vehicle. Further, the vehicle sensor information can allow for identification of the make or model of the vehicle, as well as obtaining a list of all of the available sensors and/or components in the vehicle.

Additionally, as vehicles become more complex, one module which is related to an error code may be related to multiple and sensors and vehicle modules, all of which have to be setup, initialized and/or calibrated, and whose calibration is inter-related. There is a need for machine learning methods to identify and suggest calibrations as human operators would not be able to analyze all possible permutations to determine the proper calibration.

Further, as vehicles become more complex, more generic and scalable solutions for determining calibration needs of vehicles, such as ADAS systems, or other repair information of the vehicle are required. In addition, there is a need for these calibration requirements to be provided to an end user (e.g. a service advisor or mechanic) in a human readable format which can be updated or allow for user to provide feedback.

Thus, there is a need for technologies which can allow for identification of ADAS related information from a variety of data sources, including parts build data, vehicle sensor data, or other obtainable data. There is further a need for technologies which can, from a list of data, such as vehicle sensor data, classify available sensors as ADAS or non-ADAS related systems. Technologies, including methods, systems, and architectures are needed to more easily and efficiently identify vehicles that need to be calibrated, which can be used generically across any number of makes and manufacturers of vehicles. This will ensure the safety of the vehicles on the road, reduce repair times, insurance costs, and repair costs.

SUMMARY

The present disclosures provide a technology, including any combination of methods, systems, and computer readable medium, to enable the identification of vehicles which require calibration of one or more vehicle components after a collisions.

Aspects of the disclosed technology may include methods, systems, and computer readable media to determine or provide calibration needs of a vehicle. The vehicle may have one or more vehicle sensors or vehicle components which require calibration, such as following a collision, repair, or other service.

Aspects of the disclosed technology may include a method for determining the calibration needs of a vehicle. The method may comprise receiving, from a scan tool a first diagnostic code; analyzing, using a first class of rules, the first diagnostic code; analyzing, when a first condition based on the first class of rules is not met, a repair order associated with the vehicle with a second class of rules, wherein the second class of rules is created based on an analysis of repair information; and generating as an output a vehicle sensor which requires calibration. The repair data may be analyzed using a machine learning model to obtain a first line code. The repair data may further contain at least one of (i) time spent on a task and (ii) cost of a particular task. The repair data may further analyzed be by weighing at least one of (i) time spent on a task and (ii) cost of a particular task in generation of the first line code, to generate a first weight. The first weight may be different than an output weight obtained or outputted from a trained machine learning model. The first weight may be generated based on supervised machine learning or manually set by a human operator. The first weight may be generated by the machine learning model. The machine learning model may be a natural language processing model. The machine learning model may be trained or use an XGBoost method. The first diagnostic code is analyzed against a list of Golden DTCs. The Golden DTCs can be manually tagged or created by a human operator. The diagnostic trouble codes can be classified as Golden DTCs using a machine learning model. The machine learning model can be a binary classification model. The machine learning model can be a clustering model.

Aspects of the disclosed technology may include a method for determining the calibration needs of a vehicle. The method may comprise receiving, from a scan tool a first diagnostic code; analyzing, using a natural language processor, a first set of vehicle areas from either the first diagnostic code or repair estimate; outputting, using a trained machine learning model, a second set of vehicle areas, the second set of vehicle areas probabilistically linked to the first set of vehicle areas; generating, using a second trained machine learning model, a set of vehicle components for calibration; outputting, from the trained machine learning, a binary classification of vehicle components already calibrated; and providing, to an end-user in a human readable format, the binary classification. The binary classification may indicate whether or not a particular component requires calibration. An indication of a false negative may be received. The trained machine learning model may be retrained or reconfigured upon receiving a threshold level of false negatives. The machine learning model is part of a node within a neural network.

Aspects of the disclosed technology may include analyzing a vehicle using a neural network. The method may comprise receiving, at a first layer of a neural network, a first set of parameters related to the vehicle; receiving, at a first intermediate layer, first weighted parameters related to the vehicle, the first weighted parameters weighed by the neural network; analyzing, at the first intermediate layer, the first weighted parameters to generate a second set of parameters; receiving, at a final layer the second set of parameters; and analyzing at the final layer the second set of parameters to output a list of vehicle sensors for repair or other vehicle data.

BRIEF DESCRIPTION OF THE DRAWINGS

The foregoing as well as the following detailed description of certain embodiments of the invention, will be better understood when read in conjunction with the appended drawings wherein like reference numerals refer to like components. For the purposes of illustrating the system and method of the present application, there is shown in the drawings preferred embodiments. It should be understood, however, that the application is not limited to the precise arrangement, structures, features, embodiments, aspects, and systems shown, and the arrangements, structures, features, embodiments, aspects and systems shown may be used singularly or in combination with other arrangements, structures, features, embodiments, aspects and systems.

The drawings are not necessarily drawn to scale and are not in any way intended to limit the scope of this invention, but merely to clarify a single illustrated embodiment of the invention. In the drawings:

FIGS. 2B-2E describe additional aspects related to FIG. 2A according to one embodiment of the present invention.

FIG. 9 describes an example of a method according to one embodiment of the present invention.

FIGS. 10A-10F illustrates an example of an analysis of example vehicles according to one embodiment of the present invention.

FIGS. 13A and 13B illustrate an example repair order according to one embodiment of the present invention.

FIG. 14 illustrates an example console display according to one embodiment of the present invention.

DETAILED DESCRIPTION OF CERTAIN EMBODIMENTS OF THE INVENTION

Figure 1:
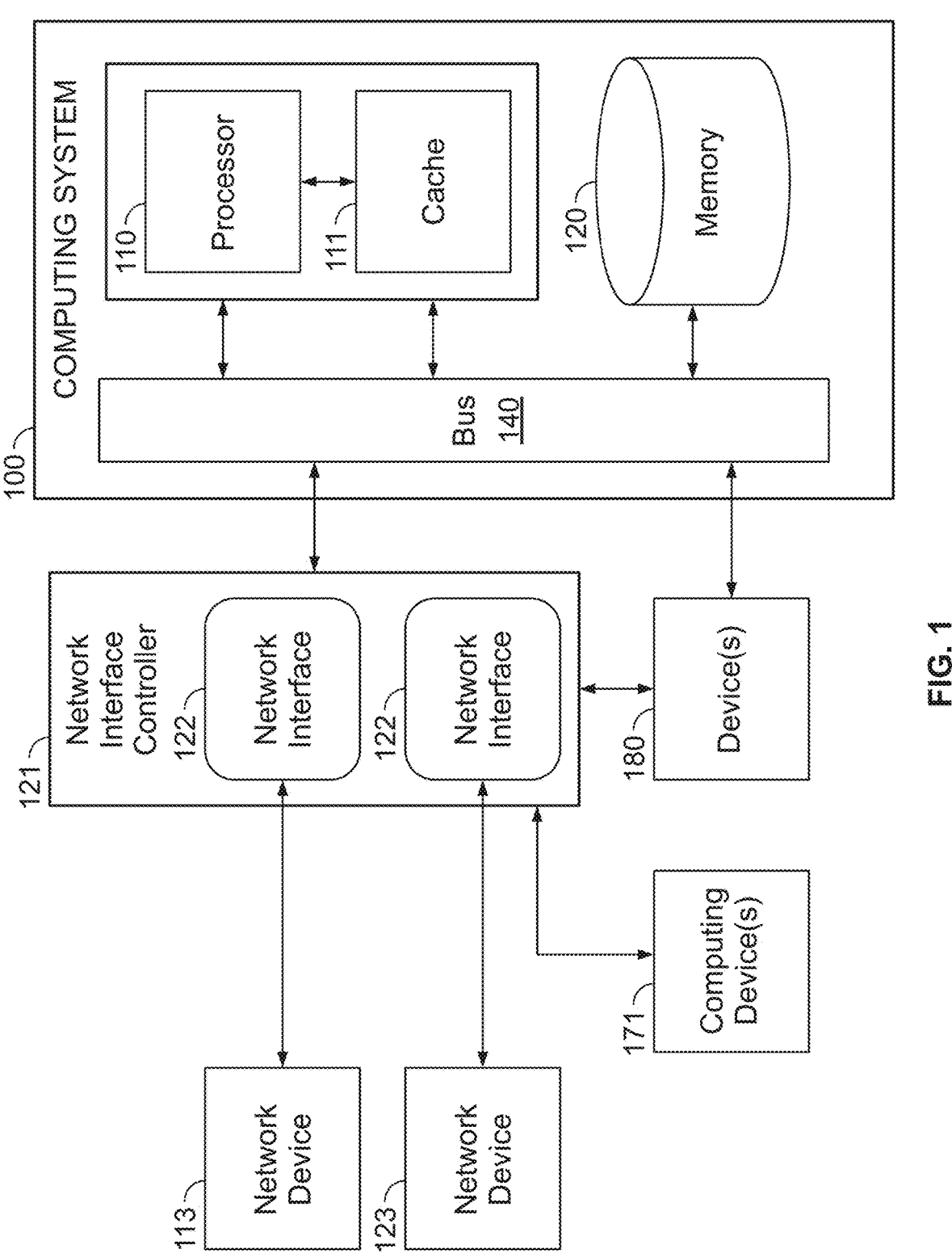
FIG. 1 is an example of a computing system according to one embodiment of the present invention.

In broad overview, the disclosed technology can be used to identify a specific module, type, or category of ADAS (Advanced Driver Assist System) modules, sensors, or components on vehicles. Identification of an ADAS system or related system can be performed using any combination of the methods and techniques described herein. In some examples, the identification of the ADAS can be based on, for example, three broad parameters or classes of parameters. In some examples, these classes of parameters can be thought of as classes of rules, which are hierarchical when analyzing an ADAS system. In some examples, the parameters or rules can also be established as rules within a machine learning or other model. While examples of ADAS are provided, the methods and systems described herein are applicable to other vehicular systems. In some examples, multiple vehicle systems can be diagnosed, either independently or in conjunction with one another, using the techniques or methods described herein.

In some examples, three classes of parameters or inputs can be used as rules, that can be used in connection with training of a machine learning model, or for analysis using a trained machine learning model, such as for example, a specific DTC (as further described below, and sometimes referred to as a Golden DTC), a parameter combining vehicle data and Collision Industry Electronic Commerce Association (CIECA)-related codes, and outputs from a Bidirectional Encoder Representations from Transformers (BERT model) interpreting repair information, accident information, or other textual information related to a vehicle or vehicle repair.

In some examples, a first class of parameters or inputs can be related to information from the data from the vehicle, such as information obtained through an on-board port. In some examples, the class of parameters or inputs can be conceptualized as a subset from a set of potential values or types of values. A second class of parameters can be obtained from repair information from an estimate of the vehicle, which can be related to information obtained from repair estimates, repair documentation, or other information generated or created by technicians or mechanics. A third class of parameters can be based on information generated or analyzed using artificial intelligence or machine learning, such as for example, those described herein. The third class of parameters can be generated or related to a "bag of words" or other natural language processing machine learning techniques. In some examples, the aforementioned three classes of parameters can be mutually exclusive in the analysis or methods used in processing information. In some examples, there can be conditional dependency between the class of parameters. In some examples, the parameters can be analyzed independently but linked through a neural network or other framework to provide a final output. In some examples, an analysis module or trained machine learning model can use all of the above described classes of parameters or inputs to determine an ADAS system or ADAS component which requires calibration.

In some examples, the artificial intelligence model or machine learning model can provide an output related to the calibration of one or more components within a vehicle. In some examples, the output of the model can be translated to a "universal" ADAS system and provided to a user through a console. In some examples, the console can be an operations console, such as that described further below.

In some examples, a rule-based system can be used to analyze sequentially, a first class of parameters, a second class of parameters, and a third class of parameters. In some examples, analysis from the second and third class of parameters can be used to check or confirm the results of the analysis from the first class of parameters. In some examples, the results from the analysis of information related to one class of parameters can be modified based on the results from outputs obtained by analyzing data contained within another class of parameters or an input from another class of parameters. As used herein, a rule can refer to any correlation between a set of inputs and outputs. In some examples, a rule can be thought of as a type of correlation or analysis on a set of inputs, similar to a function. In some examples, a rule may be a probabilistic function which uses inputs to provide a probability of an outcome in a probability space. In some examples, rules can weigh inputs to probabilistically provide output values. In some examples, the rules can allow for confidence values to be associated with outputs. In some examples, a rule may be a correlation between inputs determined by a trained machine learning model or by a human expert. In other examples, a rule may be fuzzy logic related or based.

In some examples, a first class of parameters can be related to error codes or trouble codes obtained from a scan of a vehicle, which may be correlated to modules identified as ADAS modules. An error code for an ADAS module can take priority in a series of rules or a hierarchy of analysis schema used to analyze a vehicle. In some examples, a first class of modules can be indirectly related to ADAS modules, such as for example, an airbag error code.

In some examples, a second class of parameters can be related to CIECA codes obtained from a repair information. In some examples, a CIECA code may be contained in repair information. In some examples, a CIECA code corresponding to repair information can be obtained using a rules based categorization method or a machine-based learning categorization method. Repair information related to a vehicle, whether textual, visual, voice-based, or quantitative, can be used to categorize a particular repair and identify CIECA codes or ADAS modules which may be associated with that repair. These identified modules can in turn be used to identify a specific sensor related to the ADAS module which may be in need of calibration. In some examples, "live" data from the vehicle can be used in conjunction with the identified ADAS modules or CIECA codes to further specify the specific sensor which may be in need of calibration.

In some examples, a third class of parameters can be related to identification of particular repair information which may have been incomplete, mismatched, or improperly inputted by a human operator. This third class of parameters can be used to "correct" information to generate or identify a parameter from the second class of parameters, such as when a human operator makes a typo or uses shorthand, which can in turn be used as described herein. In some examples, natural language processing methods may be used with respect to the third class of parameters.

In some examples, a BERT model can account for absent information required for the XG-Boost Model to properly predict and the XG-Boost model acts to analyze the given information to produce the results related to which parts require calibration.

In some examples, a neural network framework can be used to create relationships between the classes of parameters described. The neural network framework can weigh various inputs. Based on the weighing, a relationship between the inputs can be dynamically adjusted, and used to determine an output. A neural network can allow for dynamic analysis based on the input data and be trained using a deep learning model. In some examples, each node in the neural network can analyze one or more pieces of information. In some examples, the selection of a neural network or the existence of connections between layers or nodes in the neural network can be dynamic.

As used within this disclosure, the following terms may have the following non-limiting meaning. A person of skill in the art will appreciate that while the disclosed technology has been expressed using the following terminology, equivalent and other formulations and techniques can be used with similar terminology.

Diagnostic Trouble Codes (DTC): A vehicle's method of identifying issues in vehicle modules using a specific set of codes.

Golden DTCs: A group of specific DTCs that were picked to be used as parameters for an analysis model.

Advanced Driver Assistance Systems (ADAS): A select group of electronic systems in a vehicle made up of sensors and software that assist drivers in driving and parking functions.

Bag of Words: Words used in document classification where the (frequency of) occurrence of each word is used as a feature for the machine learning/artificial intelligence learning within a model.

Bidirectional Encoder Representations from Transformers (BERT model): A transformer-based machine learning technique for natural language processing (NLP).

CCC: A software platform for writing vehicle collision-based repairs provided by CCC Intelligent Solutions, Inc. A person of skill in the art will appreciate that references to CCC are exemplary and other software with similar functionality can be used.

CIECA: A non-profit organization dedicated to the development and standardize software and repair standards to improve the efficiency of the Collision Repair Industry.

CIECA Codes (parts code table): Codes that were created from CIECA standardization repair standards the CIECA codes. CIECA codes can be back-end codes used in collision estimate software to define parts or components on a vehicle. They may be organized and displayed on software, such as in CCC, as repair line information. A person of skill in the art will appreciate that equivalent formulations of CIECA codes may be used.

Pre-Scan: The process or step of using a scan tool before the vehicle is worked on to retrieve an electronic blueprint of vehicle modules and any DTCs that may be in the vehicle.

Post-Scan: The process or step of using a scan tool after the vehicle is worked on to retrieve an electronic blueprint of vehicle modules and any DTCs that maybe in the vehicle.

JavaScript Object Notation (JSON) data: The data format with a diverse range of functionality in data interchange including communication of web applications with servers retrieved from the scan tool.

Original Equipment (OE) Service Information: Broadly refers to OE company contacts, up-to-date factory service information, training materials, and tools. This includes service manuals, technical service bulletins, wiring diagrams, and all other service documents available to dealer level technicians.

OEM: Original Equipment Manufacturer.

Operations (OPS) Console: An information dashboard used for communication to the field teammates and repair centers throughout a repair center.

Subject Matter Expert (SME): Automotive or other technical experts that were picked based on their expertise on the topic is needed by the personnel developing an analysis model or a machine learning model.

Universal ADAS terms: Manufacturer or OEM ADAS module specific jargon matched converted, or genericized to standardized universal ADAS functions on a vehicle.

In certain embodiments, the disclosed technology can be implemented on the following example methods and systems.

FIG. 1 shows a block diagram of an exemplary computing system 100. In some examples, the computing system 100 may be utilized in implementing the machine learning modules, server systems, or other computational techniques described herein.

In overview, computing system 100 can contain at least one processor 110. Processor 110 can be a standalone processor or a plurality of processors. Processor 110 can perform actions responsive to instructions and in conjunction with one or more memory devices, such as memory device 120, which can store instructions and data. Example computing system 100 includes one or more processors 110 in communication, via a bus 140, with at least one network interface controller 121 with network interface ports 122 connecting to other computing devices 171, memory 120, and any other devices 180, such as for example, any input or output interface. The input or output interface can be any interface which allows data to be received by computing system 100 The network interface controller can be, for example, a controller based on TCP/IP, internet based, Bluetooth, Wi-Fi, ethernet, or other similar protocol.

Generally, a processor 110 will execute instructions that it receives. The processor 110 illustrated incorporates, or is directly connected to, a cache memory 111. Further, processor 110 can be made of any logic circuitry that processes instructions, e.g., instructions fetched from the memory 120 or cache 111. In some examples, the processor 110 can be a microprocessor, a central processing unit (CPU), graphics processing unit, tensor processor unit, application-specific integrated circuit (ASIC), or special purpose processor. The computing system 100 or processor 110 may include any processor or set of processors described herein which are capable of processing and operating as described herein. In some examples, processor 110 can be a special processor designed for machine learning operations, such as a tensor processor unit. The processor 110 may be a single core or multi-core processor or may be multiple processors operating collectively, in parallel, or in a distributed fashion. In some implementations, the processor 110 can be configured to run multi-threaded operations. In some implementations, the processor 110 may host or enable the operation of one or more cloud computing services or virtual machines, including cloud based virtual machines, including a hypervisor or container manager for managing the operation of the virtual machines. In some examples, processor 110 may be a virtual processor which is running or functioning on an underlying physical processing unit. In some examples, computing system 100 or processor 110 may be configured to interface with a vehicle or OBD port in order to obtain and record live data or other diagnostic data for use by a trained machine learning model or other analysis model.

Cache 111, which can also be a cache memory, can be a form of non-volatile or volatile computer memory which is placed in proximity to processor 110 to allow for offloading of data from the processor and to enable quicker read and write times. In some examples, cache memory can be a high speed memory to enable quicker functionality of the memory and read/write processes. In some implementations, the cache memory 111 is part of, or formed on the same chip as, the processor 110. In some implementations, there may be additional layers of cache 111. For instance, there may be layer 1, 2, and 3 caches, generally referred to as L1, L2, and L3 cache for a CPU.

The memory 120 may be any device suitable for storing computer readable data. The memory 120 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM). A computing system 100 may have any number of memory devices 120. In some implementations, the memory 120 may be virtualized, such as within a virtual machine environment.

The network interface controller 121 manages data exchanges via the network interfaces 122 (also referred to as network interface ports). The network interface controller 121 handles the physical and data link layers of the OSI model for network communication. The network interface ports are connection points for physical network links. In some implementations, the network interface controller 121 supports wireless network connections and an interface port 122 is a wireless receiver/transmitter. Generally, a computing system 100 exchanges data with other computing devices or network devices via physical or wireless links to the network interfaces 122. In some implementations, the network interface controller 121 implements a network protocol such as Ethernet or other network protocols. Network devices 113 are connected to the computing system 100 via respective network interface port(s) 122. The other network devices 113 and 123 may be peer computing devices, network devices, or any other computing device with network functionality.

Device(s) 180 may include other devices, such as and not limited to an I/O interface (e.g. USB or other interface devices), other external serial device ports, and any additional co-processors. Device(s) 180 may also include a user interface, which may be a screen which allows a user to interact with computing system 100, such as a touch screen or buttons. A display can also be included in device(s) 180 which may be an LCD, LED, mobile phone display, electronic ink, or other display to display information about computing system 100. The user interface can allow for both input from a user and output to a user. Further, communication interface(s) can be included, inclusive of both hardware and software to enable communication of data over standards such as Wi-Fi, Bluetooth, infrared, radio-wave, and/or other analog and digital communication standards. In some examples, communication interface can send information stored in memory to another user device for display, storage, or further analysis.

Instructions may control various components and functions of computing system 100. For example, instructions may be executed to perform any of the methods indicated in this disclosure. In some examples, algorithms can be included as a subset of or otherwise as part of instructions included computing system 100. Instructions can include algorithms to execute any of the methods or a subset of the methods described within this disclosure.

Figure 2A:
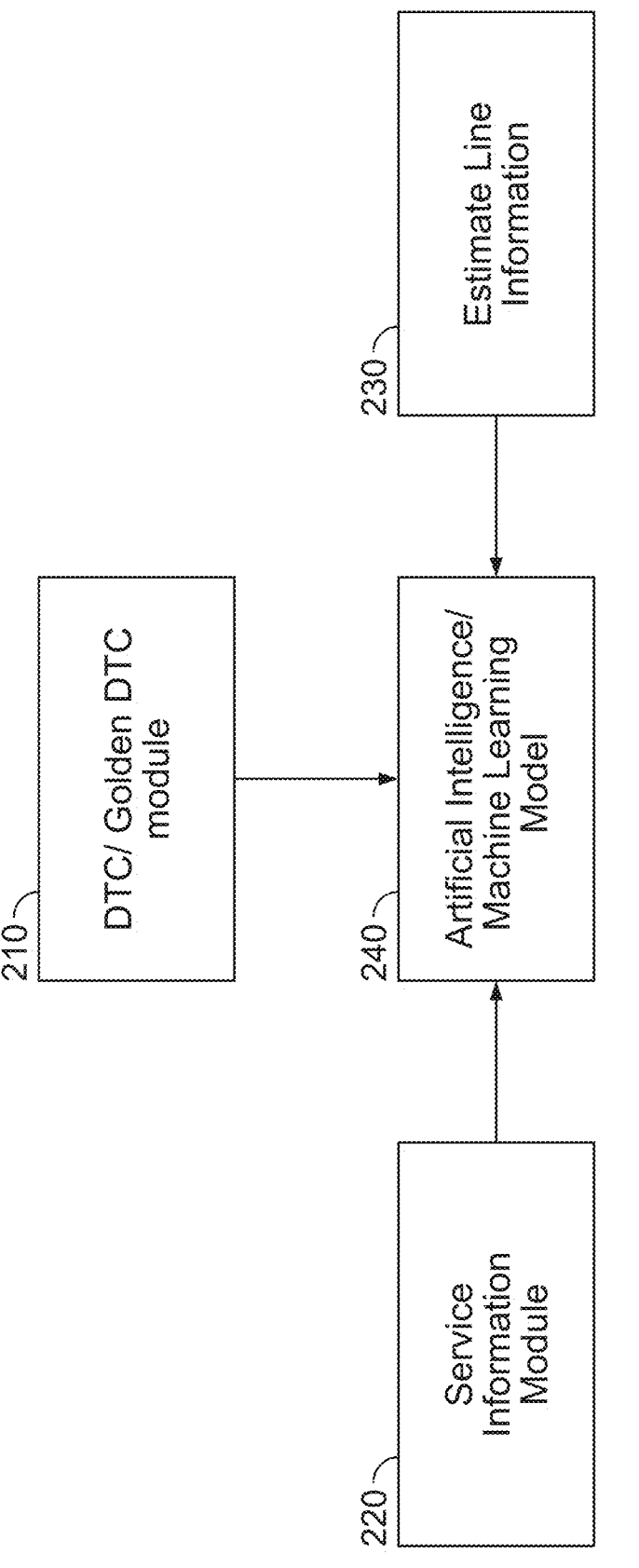
FIG. 2A is an example of a high level model according to one embodiment of the present invention.

FIG. 2A describes a high level model according to aspects of system 200. FIG. 2B to 2E further describe various aspects related to FIG. 2A.

FIG. 2B illustrates the creation or generation of generic ADAS acronyms for use in techniques described herein, as described above. Column 251 labeled "data acronym" illustrates the generic ADAS code, column 252 illustrates the full system name, and column 253 an expanded description of the generic ADAS code. As can be seen in column 251, there may be multiple ADAS codes related to one type of system, such as ACC (1), ACC(2), and ACC(3) related to various types of adaptive cruise control. In some examples, the type of vehicle can be identified from a unique set of modules or CIECA codes identified. In this manner, the VIN number of the vehicle need not be required to identify the type of vehicle. For example, machine learning or other techniques can be used to identify the type of vehicle being used.

FIG. 2C illustrates vehicle information that is acquired using a scan tool, which is filtered by DTC codes. This vehicle information can be used in determination of the calibration needs of the vehicle as further outlined below. Illustrated in FIG. 2C is column 261, illustrating a DTC code, column 262, describing the DTC code, column 263, describing a system related to the DTC code, and column 264, describing the make of the vehicle related to the DTC code.

FIG. 2D illustrates processed CIECA codes or estimate line information. As described above, using an estimating software, specific parts can be identified, and listed by their CIECA code and description based on a correlation to an ADAS related part of that particular vehicle. FIG. 2D illustrates columns 271-275. Column 271 can describe a generic system name which can be related to column 272. Column 272 can describe a code, such as a CIECA code. Column 273 can include a description of the CIECA code. In some examples, column 273 and 272 can be correlated based on a machine learning or other model. Column 274 can describe another code broadly describing the type of vehicle part. For example, BU may refer to a bumper while FE may refer to a front end. Column 275 can describe the information contained in column 274 or broadly describe the type of vehicle component.

FIG. 2E illustrates an example of identifying or correlation a component or system in a vehicle for calibration or repair in connection with an area of the vehicle, table 280. In some examples, table 280 may be obtained from OEM repair information. In some examples, table 280 can contain a number of events or occurrences under which a particular system may be affected. For example, in the specific non-limiting example provided, a forward collision warning or lane departure warning camera may be affected or require calibration upon a windshield being replaced or repaired, or a collision requiring structural repair to a vehicle. In other examples, DTC codes may be provided which can be used in determining a specific type of calibration required. In other examples, the provided information can be mined or processed to provide specific recommendations to an end-user without the end-user having to manually look up a specific error code and required calibration. In some examples, table 280 can be iteratively learned upon with feedback from an end-user to indicate whether the recommendations provided solve a particular calibration requirement of a vehicle. In some examples, one DTC code can refer to more than one camera unit and the use of machine learning can determine the specific type of camera unit, and the calibration requirements for that camera unit.

As another example, table 280 may contain specific instructions related to how to calibrate or what materials to use in calibration of a vehicle component. The "when to aim" column can contain a non-exhaustive list of when to perform certain calibrations and what steps to take in response to a particular event. Further, in the example provided, the camera aiming discussed can provide information on when to clear DTC codes, what type of target to aim a camera at, how or where to aim the camera on a specific target, responsive to the specific condition in the "when to aim" column.

With reference to FIG. 2A, illustrated is system 200. Included in system 200 are modules 210, 220, 230, and 240. Currently, to associate the parameters for the model the consideration of vehicle data, vehicle parts and service information are currently acquired, categorized, organized, and aggregated manually. System 200 can be used to automate such processes. In some examples, additional modules or information can be included or used in conjunction with system 200, such as parts build data, emissions data, or live or historically captured sensor data.

Module 220 can be a service information module. Module 220 may be a data aggregation module and may contain one or more models or instructions configured to capture or aggregate data. For instance, data can be gathered from columns 251 to 253 in FIG. 2B, column 261 in FIG. 2C, and OEM service information. The service information module can be a module containing generic ADAS acronyms, which may be recognized as a standardized term for ADAS features by National Highway Testing Safety Administration (NHTSA) and Automobile Association of America (AAA). Generic ADAS acronyms can be created to genericize or abstract out for the variations that occur across the use of ADAS features by various vehicle manufacturers and allow for more consistent processing and use in a machine learning or artificial intelligence learning model. The use of module 220 can allow for a consistent output to each ADAS feature based on usage and location on the vehicle. As one example, repairs related or correlated to a windshield may require a calibration of a front camera sensor after removing or replacing the windshield. As another example, such as per OEM service information, there may be multiple repairs which can be correlated, trigger, or relate to repair of a particular vehicle component. For instance, repairs such as a windshield removal, collision, airbag deployment, or other specified DTCs may trigger a "Windshield Camera Calibration" in a particular vehicle, which may require calibration of one or more vehicle systems or vehicle components, such as that illustrated in FIG. 2E. The calibration triggered may be referred to as a "Multipurpose Camera" or "Forward Collision Warning/Lane Departure Warning Camera" in certain vehicle makes or models, but may generally relate to a forward facing vehicle sensor or vehicle component. In some examples, the systems and methods described herein can translate an indication received from a specific vehicle to a more generic area of repair or module for repair, and provide that information to an end-user on a user interface.

Module 210 can be a Golden DTC module, which can consist of or be related to regression of codes requiring calibration specified by an OEM. At this module, vehicle module information can be acquired from the vehicle using a vehicle scan tool. The vehicle module information can be stored or formatted as JSON data. This data can be filtered by separating ADAS and non-ADAS modules to only include ADAS relevant or related data. For example, in certain vehicles, OEM service information may indicate that when a front airbag, such as a steering wheel, passenger dashboard, or curtain airbags are deployed, a calibration of the front windshield camera is required. In this example, non-ADAS modules, such as those related to the airbag, can be connected or related to a vehicle component which requires calibration. Through the use of DTCs in the ADAS related modules, the data can be aggregated by the priority of a specific trouble code. As can be seen in FIG. 2B, the ADAS feature (column 252) can be assigned a generic system name (column 251).

In some examples, based on OEM service information, a human expert, a rules-based computing system, or a trained machine learning device or artificial intelligence, can collect and organize a group of DTC code numbers and descriptions related to ADAS systems that a vehicle generates in particular situation. Although this is described with respect to ADAS systems, the process or method can be generalized to any vehicle error code or similar system.

The data can be aggregated by system name and by vehicle make, such as described in FIG. 2C. The DTC and the DTC description (columns 261+262) are then listed with their respective ADAS module by vehicle manufacturer (columns 263+264).

Module 230 can be an estimate line information module, which can be formed from or allow for the processing of CIECA codes. In some examples, through the use of a complete vehicle parts list which can be stored in estimating software, specific parts are identified and listed by their CIECA code and description (such as in columns 272+273 in FIG. 2D) based on a correlation to an ADAS related part on that vehicle. Any specific parts, which may be related to a particular car or parts manufacturer, may be associated or assigned a generic system ADAS names by a vehicle repairer (such as in column 271 in FIG. 2D). A person of skill in the art will appreciate that other formulations are possible and that CIECA information alone need not necessarily be used. Additional information can be included or correlated with CIECA codes, such as for example, data representing a type of labor performed in line item codes.

As further explained with reference to the figures herein, machine learning module 230 can enable for an automated machine learning model. An ML or AI model can refer to the model that will ingest the JSON data from the pre scan and the estimate date from the repair order and identify vehicles that need calibration. In some examples, an XG Boost or BERT model, as further described herein can be used to estimate a CIECA code.

Manufacturer Charts (Service Information) can be included in machine learning module 240. Once machine learning module 230 associates the proper Universal ADAS acronym, these Excel™ sheets allow a separate function to convert the acronym into a phrase that an end user can apply to an estimate and is also used in the metrics Caliber Collision™ uses to track accuracy and completion.

Each manufacturer may have its own sheet that is updated and maintained manually. To enable use of a model a pre-scan needs to be performed where JSON data is received. In some examples, information related to the most popular 10 manufacturers of vehicles (e.g. Toyota™/Lexus™, Honda™/Acura™, Nissan™/Infinity™, Ford™/Lincoln™, Hyundai™/Kia™/Genesis™, Mazda™, VW™/Audi™ Chevrolet™/Buick™/Cadillac™/Buick™/GMC™, Subaru™, and Dodge™/Ram™/Chrysler™/Jeep™) can be uploaded or stored. The parts code table can be updated with the corresponding calibrations values for these known manufacturers. If estimate lines do not match exactly to calibration values in the parts code table there will be difficulty matching to the operations console. As used herein Operations Console can refer to a user interface or console, which can allow for reporting of diagnostics from scans (and ADAS identification).

Figure 3:
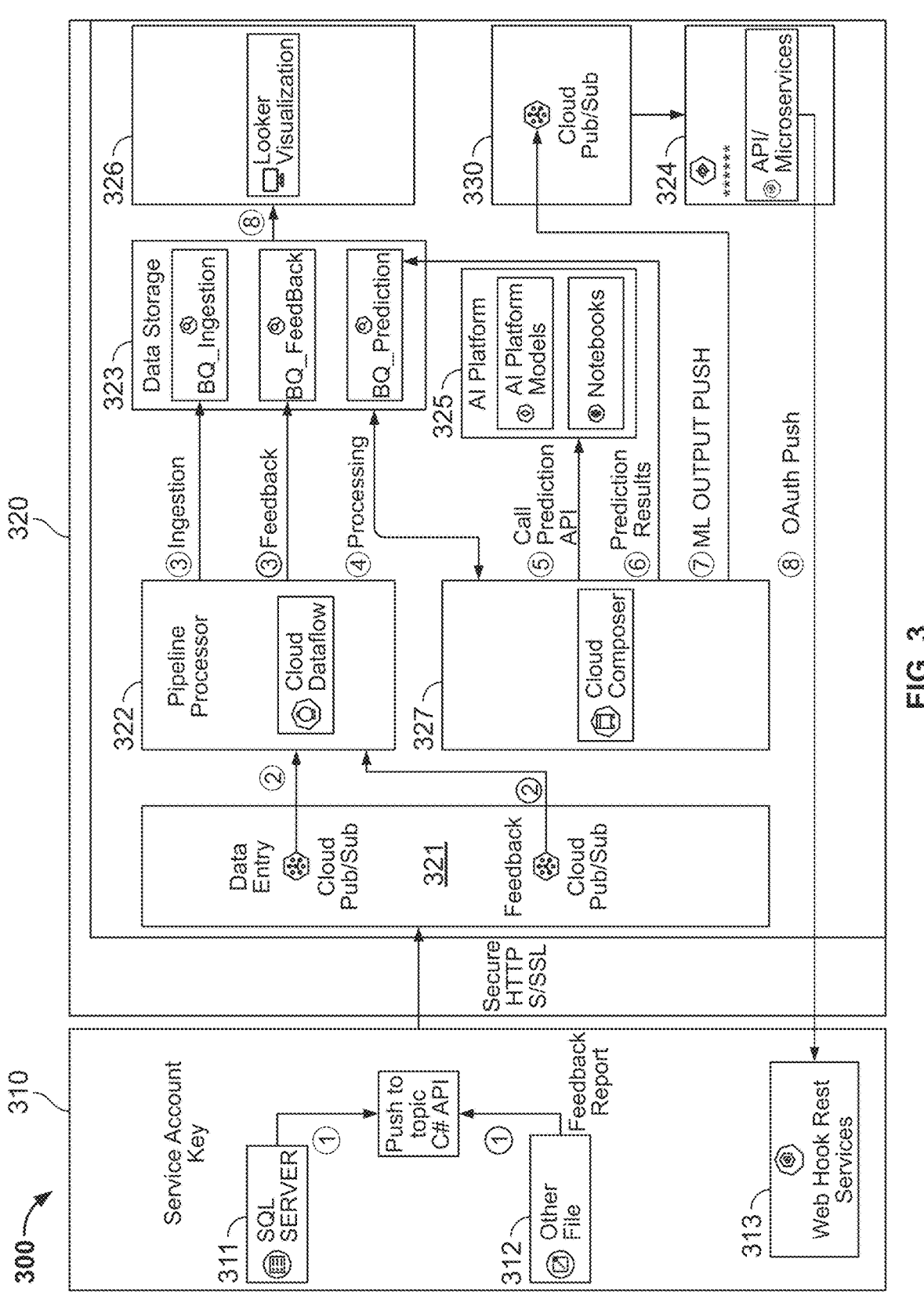
FIG. 3 illustrates an example of a schematic related to aspects according to one embodiment of the present invention.

FIG. 3 illustrates a schematic related to aspects of the disclosed technology, schematic 300.

Illustrated in FIG. 3 is an "on-premises" computing device 310. The "on-premises" device can be connected to a cloud platform 320 through, for example, a secure networking layer, such as HTTP or SSL. Schematic 300 can use a publication and subscription model to push data through from computing device 310 to cloud platform 320.

Computing device 310 can be similar to computing system 100. Computing device 310 can contain an SQL server 311, other files 312, and a web hook rest services module, 313. The SQL server 311 and other files 312 can be in communication to push or provide information to the cloud platform 320 through an API. In some examples, the API can be a "push topic" API, such as those used in the Kubernetes framework, for a "topic" to be subscribed to and pushed to the server.

Computing device 310 can receive information from a vehicle through an OBD port or other method, and combine that information to push that information to cloud 320. Computing device 310 can combine information from an SQL database with other information, such as a "feedback report" or other feedback information as part of the information it configures, formats, and provides to cloud 320. The feedback report can include information related to a prediction, such as a false positive, which can in turn be used in training or in the analysis performed by machine learning models or techniques. Such information can be stored in other files 312.

Cloud platform 320 can be any cloud platform device or provider which allows for cloud computing and related functionality to occur. In some examples, the cloud platform can additionally have or be configured using container orchestration systems, such as Kubernetes or Docker™, to allow for deployment, scaling, and management of virtual machines within a cloud environment. In some examples, cloud platform 320 may contain cloud Identity & Access Management (Cloud IAM) which enables administrators to authorize who can take action on specific resources. Cloud IAM provides a unified view into security policy across an entire organization, with built-in auditing to ease compliance requirements.

Data pushed or otherwise provided from computing device 310 can be received at module 321 of cloud platform 320. Data can be provided to a pipeline processor module 322 which can be in communication with data storage module 323. Data storage module 323 can also be in communication with module 324, which can call AI platform 325 through, for example, a call prediction API. Data storage module 323 can be a cloud database solution which can use SQL. For example, data storage module 323 can use a Big Query or similar database structure.

AI module 325 can contain AI platform models or other trained machine learning models which can be used to process or analyze the input data and output, using one or more trained machine learning models, an output. Thereafter AI platform will send the results to Cloud Composer™, after which Cloud Composer™ will then send the results to a cloud Pub/Sub module 330, from where results will be pushed. In some examples, the results can be pushed to a Webhook and BigQuery to "on-premises" computing device 310, where information can be received by an end-user who may be diagnosing, repairing, or calibrating a vehicle or vehicle components.

In some examples, AI module 325 may support models trained using libraries such as XGBoost, Scikit-Learn, and Tensorflow, which all contain a specific model format to be used. In other examples, the machine learning models can be auto-scaled or chosen by a user to contain a specific number of nodes within the AI.

Examples of machine learning models and machine learning algorithms are further provided herein. A person of skill in the art will appreciate that one or more machine learning models can be stored or used within AI module 325.

Looker visualization module 326 can allow for visualization of data or outputs from a trained machine learning model. Looker visualization module 326 can be a variety of data visualization tools as appreciated by one of ordinary skill in the art. In some examples, looker visualization module 326 can allow for visualization of additional aspects of the cloud computing environment, such as virtual machines, virtual resources being used, or computational loads being placed on the environment.

Cloud composer module 327 can be a data workflow orchestration service that can author, schedule, modify, or monitor data pipelines from modules in 320. Cloud composer module 327 can take inputs from data storage module 323 and AI platform 325 to provide and push prediction results to web hook services 313, which can exist on premises, and be configured to receive data from 320 through a cloud pub/sub module 330 and module 324. In some examples, cloud composer can contain or host one or more virtual machines which can be scalable to the number of incoming requests. In some examples, the amount of physical or virtual resources allocated to a specific virtual machine can be increased to accommodate and meet performance metrics for incoming requests. In some examples, the virtual machines can be hosted on a Kubernetes or similar framework.

Figure 4:
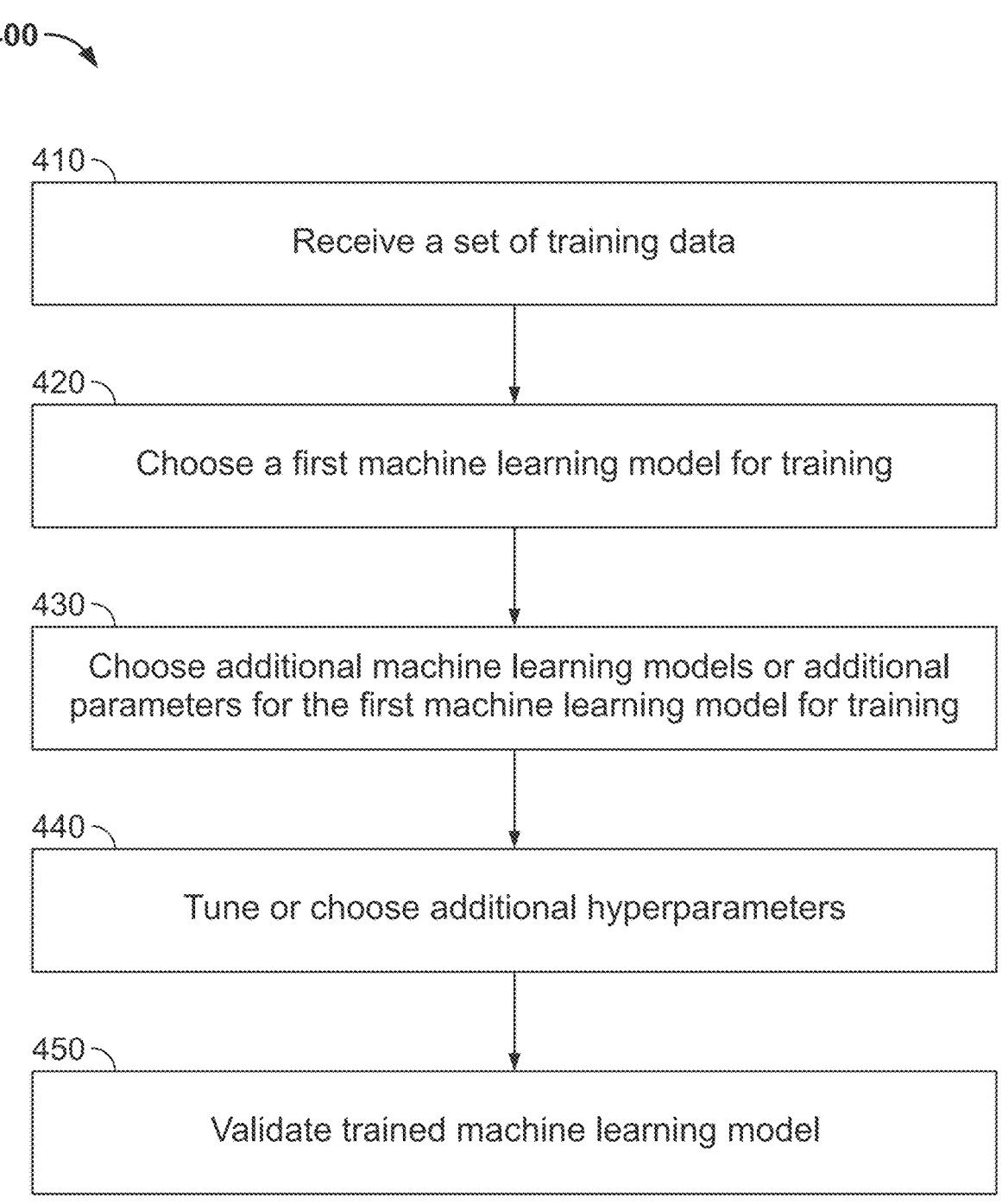
FIG. 4 illustrates an example of a flowchart related to various aspects related to training a machine learning model according to one embodiment of the present invention.

FIG. 4 illustrates a flowchart related to various aspects related to training a machine learning model according to aspects of the disclosed technology, method 400. While method 400 is an example related to training a machine learning model, a person of skill in the art will appreciate that other models can be trained in a similar manner or using other techniques.

At block 410, a set of training data can be received. The training data can include a bag of words and at least one class of parameters, such as those described above. A bag of words is a representation which can be used in natural language processing and information retrieval, wherein grammar and other elements of natural language can be ignored. The training data can also include desired outcomes for each input. In some examples, the training data can be input as a string, such as an input and desired outcome, e.g., {dropped frnt bmp, front bumper}.

In some examples, the set of training data being received and being trained for is based on identification of ADAS modules from a list of obtained modules of a vehicle. The set of training data may be a range of ADAS modules, vehicle data, such as year, make, model, or sub-model, and a flag for whether the ADAS module is active or inactive. The machine learning model can be trained to determine whether any module should be classified as an ADAS module or not.

In yet other examples, the set of training data can include a second set of parameters, such as those described herein. The set of training data can include a desired classification to be a set of ADAS module(s), system(s), or vehicle component(s) associated with that particular second set of parameters. In some examples, the dataset on which the machine learning model is trained can be updated based on feedback from an end-user, such as a mechanic or repair specialist, who can indicate whether the calibration provided what was required. In this manner, the number of false positives can be minimized. As checking each false positive is a manual process, this reduction would further increase efficiency in the repair process. Additionally, if the number of false positives exceeds a certain threshold in practice or in the field, an indication can be provided for the model to be retrained, with additional parameters, such as additional data obtained from the OBD port.

In some examples, the datasets illustrated with respect to FIGS. 10A to 10F and FIGS. 13A and 13B can be used for training of a machine learning model or calibration model.

At block 420, a machine learning model to be trained can be chosen. For example, a clustering based machine learning model can be used, such as Latent Semantic Indexing. In other examples, any of density-based, distribution based, centroid based, k-means clustering, DBSCAN, and spectral clustering algorithms can be used. In other examples, binary tree classification methods can be used, wherein machine learning can be used to weigh the various connections within the tree. A person of skill in the art will appreciate that any suitable machine learning model or combination of models can be used to achieve the analysis methods described herein.

At block 430, a second machine learning model or parameters related to the machine learning model can be chosen. In some examples, it may be desirable to use the outcome of the first machine learning as an input to the second machine learning model. The second machine learning model can be trained in parallel with the first machine model, and errors or outcomes, can be observed as they are propagated from the first machine learning model to the second machine learning model. For example, if "dropped frnt bmp, front bumper" is associated with a dollar value which is relatively low, the second machine learning model or a component of the machine learning model may interpret that to imply that minimal work was done to the front bumper, and use that information in a decision process accordingly, such as when determining if a module related to the front bumper would be present. In some examples, neural network models or techniques, such as those described with respect to FIG. 12, can be used to weigh certain features or combinations of features. In some examples, a sub-model can be included in a model or configured to be used in conjunction with another model.

At block 440, the hyperparameters can be chosen or tuned. In some examples, certain hyperparameters can be chosen or weighed more heavily based on more likely outcomes.

At block 450, the trained machine learning model can be validated. Example validation methods have been further described herein.

Figure 5A:
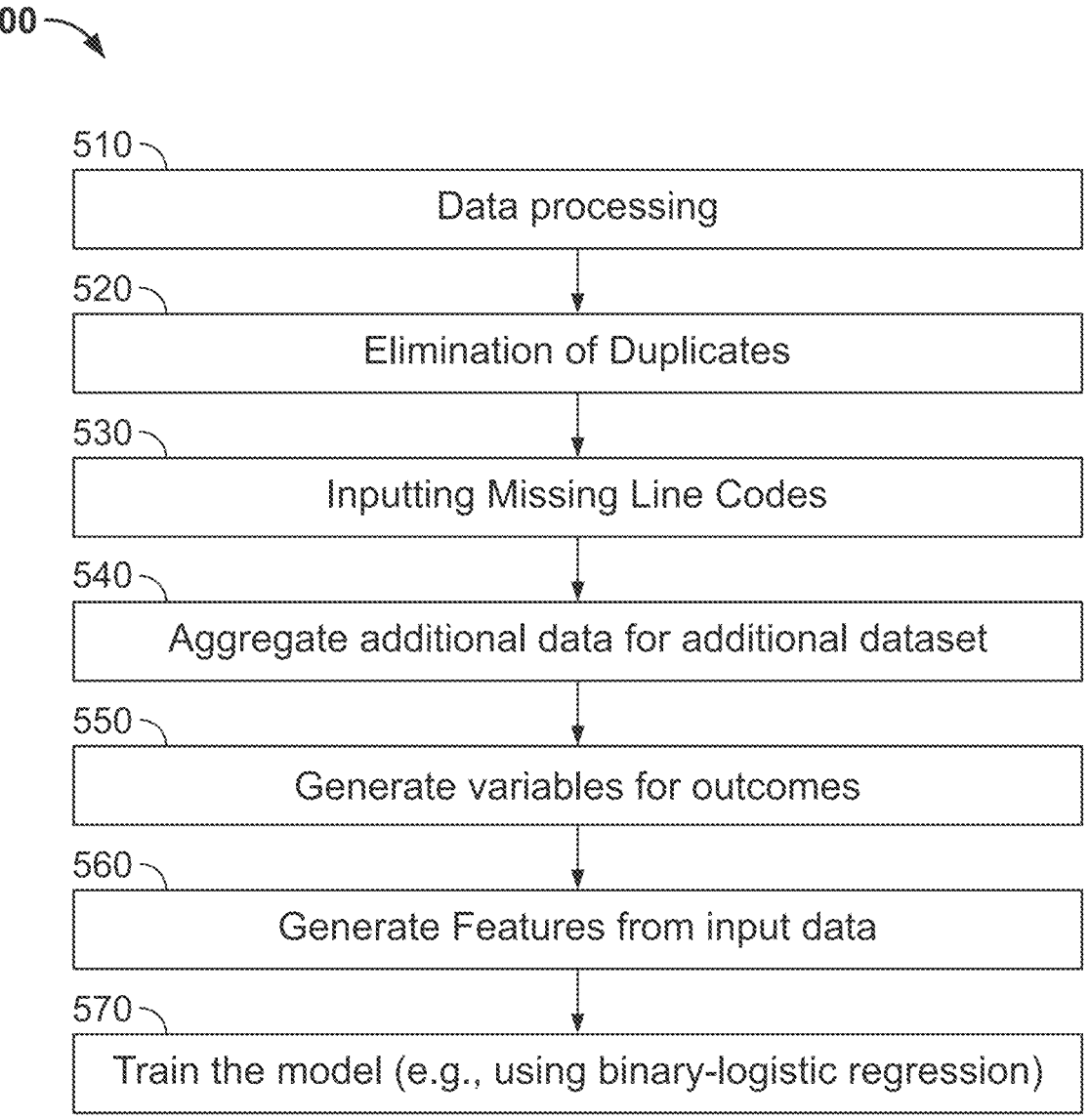
FIG. 5A describes examples of a method according to one embodiment of the present invention.

FIG. 5A describes method 500 according to aspects of the disclosed technology. In some examples, the datasets illustrated with respect to FIGS. 10A to 10F and FIGS. 13A and 13B can be used for training or verification of a machine learning model.

Method 500 can start at block 510. At block 510, a data processing step can occur. After receiving the data, it is cleansed and joined appropriately into a tabular format that can be fed into the trained ML-model. Between receiving the data and feeding it into the model, few typical steps mentioned below will be involved in preparation of the data.

At block 520, duplicates can be eliminated. While training, it is possible that the same scan-id can reappear in the scan-data. The first incoming scan-id based on the "ModifiedOn" field and "DiagnosticTime" field can be considered to process the first entry in the case of scan-version-data.

At block 530, missing codes can be inputted. Often, it can empirically be observed that 70% of the LineCategoryCode and LineMemo fields are empty (or assigned "NULL"). This would drastically limit the amount of data considered for training as both LineCategoryCode and LineMemo are to be considered instead of LineDesc which was used in the PoC model. On the other hand, incoming live stream can have empty fields, where a DistilBERT model can be trained to impute the linecodes.

In one embodiment, a DistilBERT model can be used to enhance the data. DistilBERT can be a transformer model that can predict the CIECA (Collision Industry Electronic Commerce Association) codes using the LineDesc, LineMemo and Car-manufacturer. In some examples, the input to DistilBERT can be a string concatenation of line description, line memo and car manufacturer information if it is present. The DistilBERT model predicts the line category code based on this input string. To improve the model accuracy, the model is trained on ADAS related line category codes. If the string doesn't correspond to an ADAS code then the model outputs "not_ADAS" as the line category code. In some examples, certain codes can be related to ADAS line codes indirectly or conditionally, such as when an airbag is deployed during a front collision, which can indicate that a calibration of a particular vehicle component may be necessary.

The DistilBERT model can be trained on all the historical data where line category codes and line descriptions are present. The trained model can have a certain accuracy requirement. To further improve the accuracy, only impute line category codes when the predicted confidence level is greater than a predetermined amount can be included, and by using a sufficient threshold, the resultant model accuracy can be increased.

At block 540, additional data can be aggregated to create a more robust data set for model training or analysis. As certain non-limiting examples, features which may be aggregated can include Fault-counts or ROCounts, which may be used in proof of concept. In some examples, features may be included if they prove or can improve the accuracy of the machine learning model.

In some examples, the set of features can be calculated by aggregating the multiple records in scan-content data and EstimateLine-data and grouped together by count, sum and average. These features provide the count of records with same ids or values and their corresponding sums and averages which can be helpful to the model. Further, certain fields in Estimate-line data that are useful for the model are String-aggregated into one value while joining the three tables into one to reduce duplication of rows.

An example aggregated table schema is provided below:

| Field Name | Type | Mode |
|---|---|---|
| Id | Integer | Nullable |
| CarVIN | String | Nullable |
| RONumber | Integer | Nullable |
| CarYear | String | Nullable |
| CarMake | String | Nullable |
| ModifiedOn | String | Nullable |
| IsADAS | String | Nullable |
| LineData | String | Nullable |
| DbLaborHrs | String | Nullable |
| PartPrices | String | Nullable |
| ScanContent | String | Nullable |
| Publish_time | TimeStamp | Nullable |

As used above a mode "nullable" is a data type where the particular field can be set to a special "Null" value instead o the normal type of value. Thus, when data is not available, a particular field can be set to null.

In some examples, certain fields and the information contained therein can be "string-aggregated" so that the corresponding information can be received in a single row.

At block 550, outcome variables can be generated. In machine learning use cases, there is always a target outcome or variable which is the "ground truth" or considered to be a true value based upon which a model can be trained or the model learns to predict upon. In some examples, the outcome data can be a binary choice, whether a calibration for the vehicle or a component of the vehicle is required.

In some examples, a rule-based machine learning model can be used. For example, a first rule can be used or programmed to logically imply that, if any of the DTCs in a scan turns out to be a golden-DTC from the list provided, it will consider that calibration is needed for that scan. In this rule, a "Golden DTC" table can be considered, wherein a compilation of golden DTCs can exist for all known car-makes. To determine whether calibration is needed or not for every scan, the "dtcCode" fields in the Scan-Content column can be parsed and checked if any of the dtcCode is a golden DTC or not for a specific car-make. If a DTC is detected for a particular vehicle and matches with a known or existing golden DTC, then the calibration is marked as needed, i.e., "true," in a particular table or database, and the particular vehicle component related to the same is marked.

Another rule may indicate that a calibration is needed if a specific combination of the DTC-system and linecode exists in an ADAS-system and linecode mapping is obtained. This rule may co-exist with the rule described above in which case calibration would be needed. To determine the outcome of this rule, and to refer whether or not a particular DTC-System is an ADAS or not, a dictionary/mapping of DTC-Systems is created for each car-make. This mapping allows a determination if a particular DTC-System string extracted and cleaned from the Scan-Content field matches with any of the ADAS strings in the provided ADAS-LineCode-GenericSys table for a specific car-make or not along with the GenericSystem and the Linecodes it mapped to from that table. In broad overview, the string-matching is done using cosine-similarity scores between all cleaned DTC-System strings and ADAS strings. A glimpse of the mapping can be seen below. In this manner, it is feasible to determine whether or not a second rule can be flagged for each car-make. Likewise, outcome variable is generated for all car-makes on the training data using the generated mapping.

At block 560, upon completion of the outcome generation, features can be generated from the raw input data that may allow the model to predict whether or not calibration is needed. In some examples, the following set of features can be used. However, a person of skill in the art will appreciate that another set of features, including those containing hidden variables or hidden features, or an equivalent formulation of features can be discovered. The following are a non-limited example set of features or parameters which can be trained on:

"ROCount": Total number of LineItemCategoryCodes in the data

"pass_count": Number of DTC-Statuses that are marked as "Pass|No Fault"

"fault_count": Number of DTC-Statuses that are marked as "Fault"

"year_gap": Difference between the ModifiedOn and the CarYear in years.

"IsADAS": Boolean column about ADAS from the DiagnosticScan table.

"adas_true_count": Count of "adas" key in the ScanContent that are marked as "true".

"sum_labor_hrs": sum of the DatabaseLaborHours for all repair-orders.

"avg_labor_hrs": average of the DatabaseLaborHours for all repair-orders.

"sum_part_prices": sum of the PartPrices for all repair-orders.

"avg_part_prices": average of the PartPrices for all repair-orders.

"Manufacturer": what manufacturer a car-make belongs to is stored as an encoded feature (e.g. one binary column for each car-manufacturer).

At block 570, the model can be trained. After features are generated on the input data, the next step is to train a model on the data. In some examples, the model being trained can be a binary-logistic-regression or binary classification model that shows the odds that a particular item belongs to a class (such as for example, the class of "calibration needed" or "calibration not needed"). As one example, this model can be trained using the "Xgboost" framework in Python, although other training frameworks are possible.

At this block, the data can be split into training and testing data, such as with a 70-30% or 80-20% split. After splitting the data, a Bayesian-optimization algorithm can be applied to the data in order to filter the optimum hyperparameters suited for training the model. Then on the tuned hyperparameters, the Xgboost model can be trained with earlier generated outcomes as a target. Hyperparameters can be certain values or weights that determine the learning process of an algorithm. Upon the model reaching a sufficiently low level of "loss" the training can be considered to be completed and halted, at which point the model can be tested on the test-data to understand the accuracy of the model.

In some examples, additional weighting or training can occur on the machine learning model. For example, weighing of values can be used to eliminate false negatives. As one example, repair estimates with low dollar values for tasks (e.g. $1 to remove a bumper) or less than 1 labor hour can be filtered and deemed irrelevant. In other examples, certain words in a description of a task or body repair operation can be semantically deemed as not triggering positive calibration requirements. For example, in "mask rear bumper" and "rope windshield", the model predicts a positive Calibration event based on the words "rear bumper" or "windshield" but the qualifying word(s) "MASK" or "ROPE" indicates a minor operation that is not technically relevant to the safety systems this tool is designed to account for in the repair process.

Figure 5B:
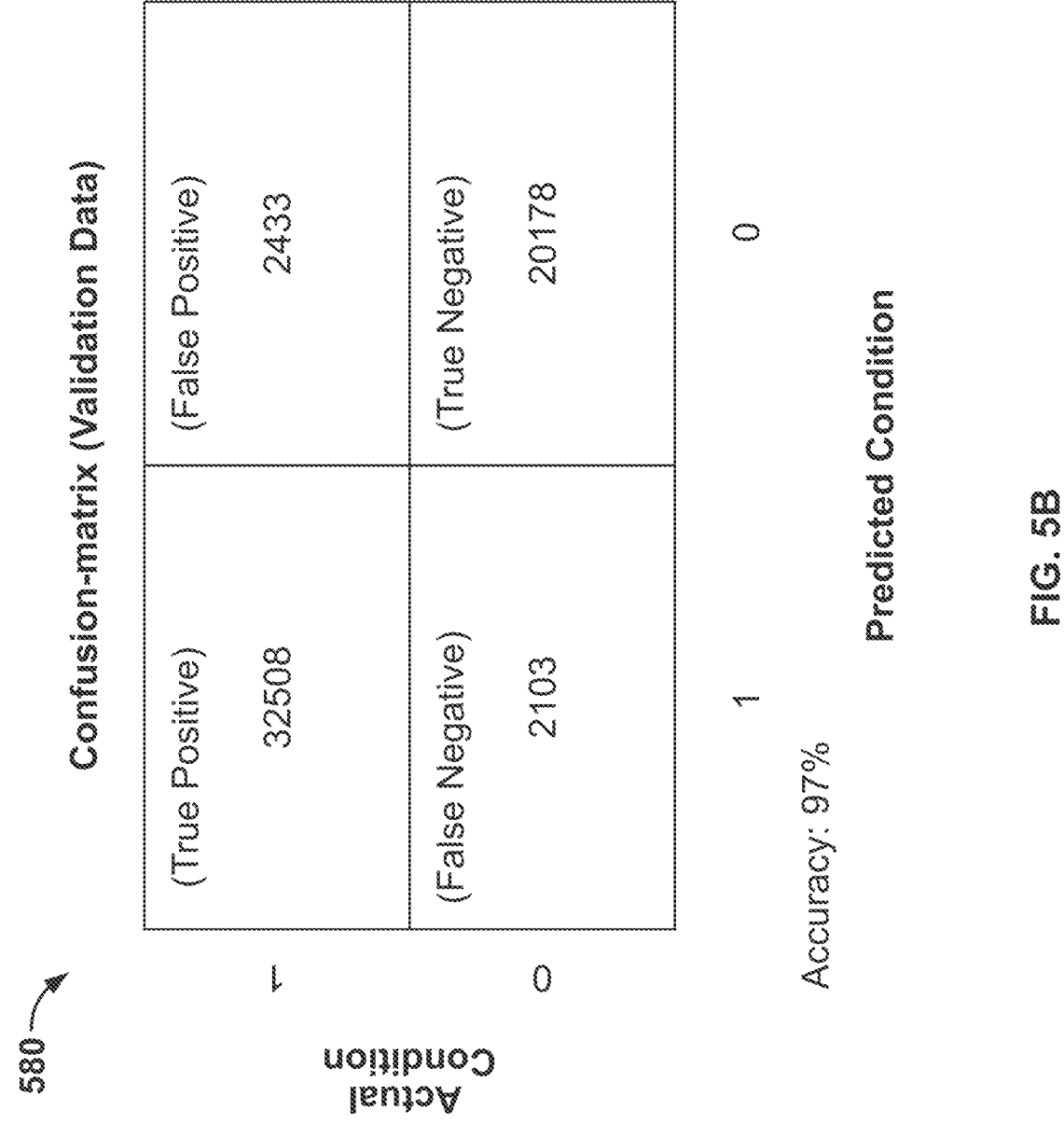
FIGS. 5B and 5C illustrates examples of confusion matrices according to embodiments of the present invention.
Figure 5C:
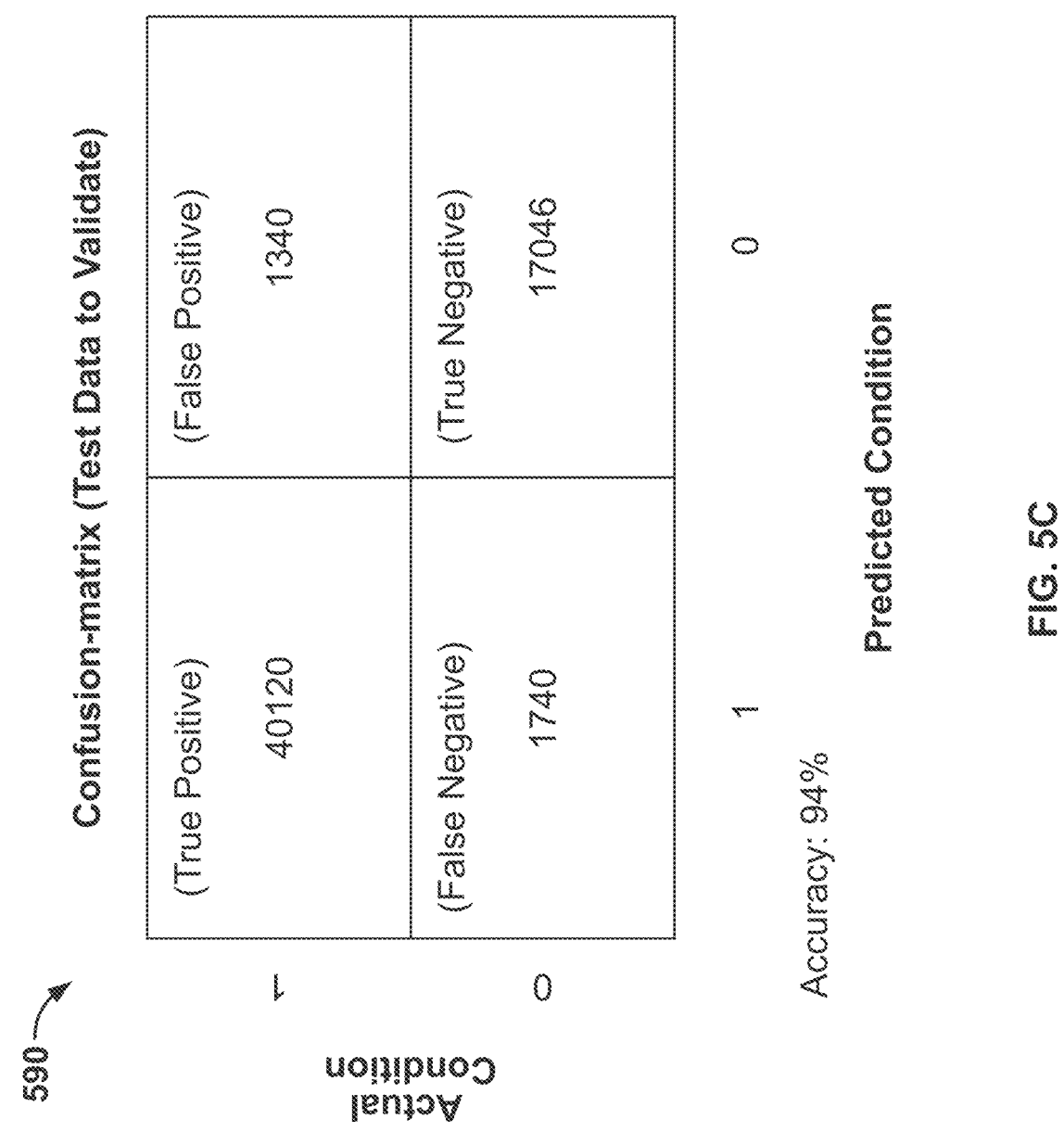

Example confusion matrices are illustrated in FIGS. 5B and 5C. A confusion matrix allows visualization of the performance of an algorithm, typically in supervised machine learning, In the confusion matrix, the number of true negatives, false positives, false negatives, and true positives can be observed, and used to determine whether training is complete.

Illustrated in FIG. 5B is a confusion matrix 580. Confusion matrices represent counts from predicted and actual values. True Positive indicates the number of positive examples classified accurately while True Negative indicates the number of negatives examples classified accurately. FIG. 5B is generated on training data, which is known, and allow for the model to be trained until a desired accuracy is achieved by the model. For a given number of test cases, the number of false positives, false negatives, true positives, and true negatives can be observed. The model can be trained or re-trained until a desired accuracy is reached. In some examples, the accuracy may converge as the model is trained to a limit and an accuracy sufficiently close to a convergence value may be chosen.

In some examples, the model can be iteratively trained until the desired ratio of accuracy, false positives, false negatives, or reducing or minimizing the ratio of false positives is achieved for a particular model.

Illustrated in FIG. 5C is confusion matrix 590. Confusion matrix 590 is created by using the machine learning model on validation data. Validation data can be used to determine the accuracy of the model and ensure that the model has not been overtrained and is robust across a new set of non-training data. For a given number of test cases, the number of false positives, false negatives, true positives, and true negatives can be observed. This validation data can test the trained machine learned model to ensure that the model is trained and robust across a variety of data.

Figure 6:
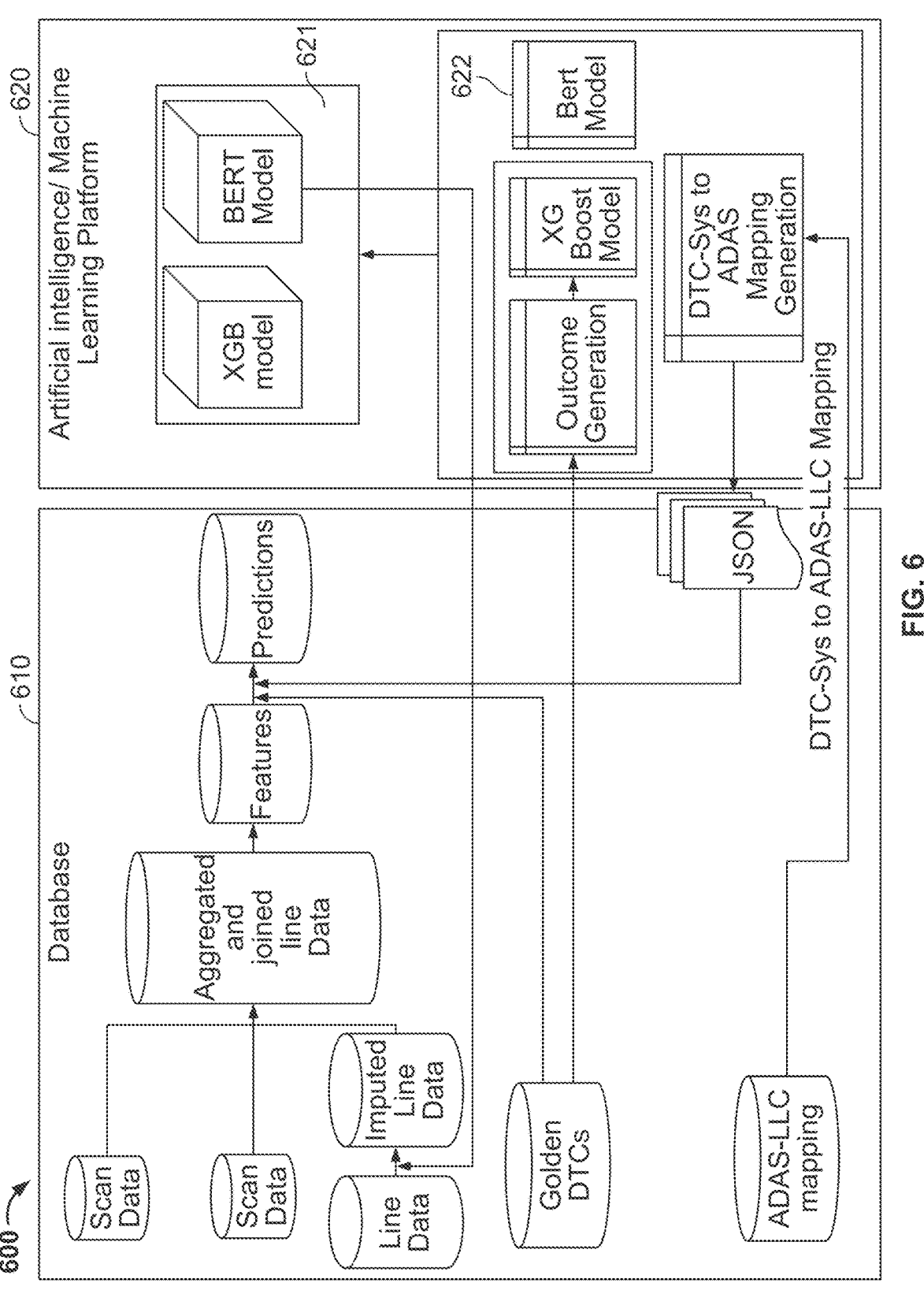
FIG. 6 illustrates an example of a model hosting framework according to one embodiment of the present invention.

FIG. 6 illustrates an example model hosting framework according to aspects of the disclosed technology.

Illustrated in FIG. 6 is an example framework 600. Framework 600 can be used to store ADAS and vehicle related data, provide that data to a machine learning or artificial intelligence platform for analysis, and receive results from that platform.

Illustrated in framework 600 is data platform 610, and artificial intelligence (AI) platform 620. Data platform 610 can provide pipelines of information to AI platform 620 for further analysis.

As illustrated in FIG. 6, data platform 610 may contain a scan data module, scan-verification data module, line data module, and golden-DTCs module, and ADAS-LLC mapping module. The scan data module and the scan-verification data module can contain header information, which contains data from a specific vehicle scan, and JSON version data or scan version data, which contains historic data about the vehicle, respectively. Line data module can contain line data related to repair orders or estimates. The scan data, scan verification data, and line data can be aggregated to create a combination of aggregated data and/or a joined data set, which in turn can be filtered or modified to create a set of features for use in machine learning applications. The line data can also include data from a BERT model contained in models module 621. The BERT model can enhance line data that is available through machine learning techniques. Features can be a set of parameters chosen for use in analysis in a machine learning model. In some examples, features can be chosen based on weights assigned to one or more parameters during a training process of a machine learning model.

Notebooks module 622 can contain various "notebooks" which can be written or programmed in python, or other programming languages. As illustrated in Notebooks module 622, an XGBoost model notebook, a BERT model notebook, an outcome generation notebook, and a DTC to ADAS mapping generation module can be included. Golden-DTCs can be provided to the outcome generation notebook as part of use in a machine learning training of, for example, the XGBoost model. Similarly, ADAS to line code mappings can be stored in the DTC-sys to ADAS mapping generation notebook, and provided through the outcome generation notebook to the XGBoost model module for training.

Notebooks module 622 can allow for retraining of a BERT model, an XGBoost model, and other machine learning models based on updated or new data.

Turning back to models 621, the XGBoost model can provide outcomes or outputs, which can be used, along with selected golden-DTCs and correlations of ADAS to line codes, to provide predictions of which vehicle components require calibration. These outputs can be used and provided on a console for end-users to determine calibration, and further provide feedback, such as through the system described with respect to FIG. 3. In some examples, the models can be further updated or trained with data such as that described with respect to FIG. 10F.

Figure 7:
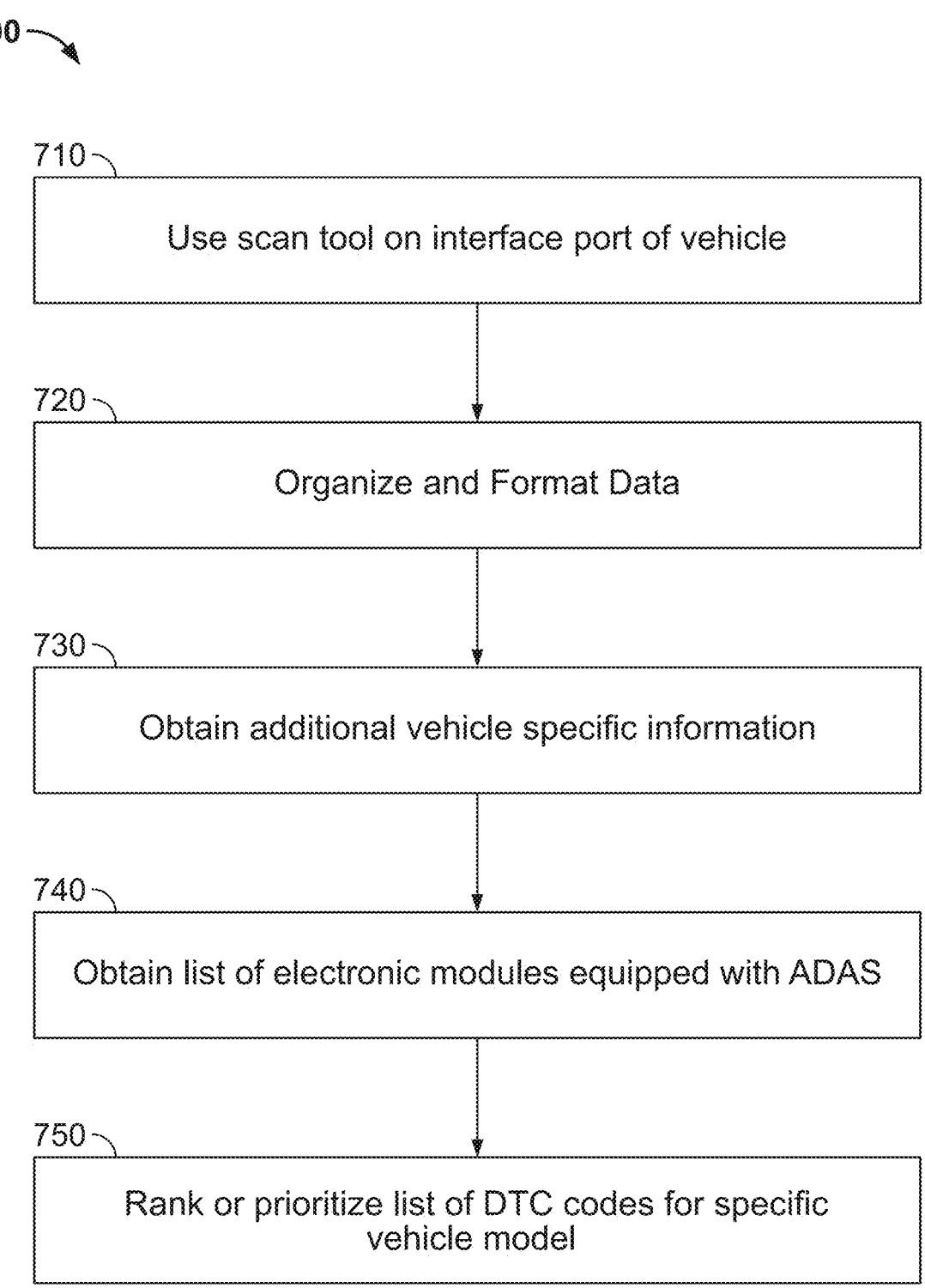
FIG. 7 describes an example of a method related to a "vehicle side" according to one embodiment of the present invention.

FIG. 7 describes a method 700 related to the "vehicle side" according to aspects of the disclosed technology.

At block 710, a scan tool can be used through one or more interface ports on a vehicle. For example, an on-board diagnostic (OBD) port can be used to obtain information from an interface port on a vehicle. In some examples, diagnostic trouble codes can be obtained at this block. In other examples, live data or historic data from the vehicle can be obtained. Data logging modules can also obtained and log additional data for analysis in conjunction with the machine learning modules.

At block 720, data can be organized or formatted. In some examples, the data can be formatted into a JSON format.

At block 730, additional specific vehicle information can be obtained. In some examples, the year of the car, the make, model, VIN, the vehicle's on-board module configuration, and list of DTC modules can be obtained. While the examples provided are non-limiting, each piece of information need not be obtained or required for the techniques or methods described herein. For example, while a make or model may be obtained, a specific VIN or sub-model may not be required or obtained. In some examples, the specific machine learning module or related modules may specific which inputs are desired.

At block 740, a list of electronic modules within the vehicle defined as ADAS equipped modules can be generated or obtained.

At block 750, specified module or specific corresponding DTC codes can be ranked or used in order of priority. In some examples, the DTC codes can be "golden" DTCs as explained herein and be used to determine the calibration needed for the vehicle.

In some examples, even with a golden DTC, further analysis can be done with other repair information from the estimate or from other artificial intelligence/machine learning based information to verify that the golden DTC is indeed correct. In other examples, other DTCs, which may not be golden DTCs, can be used in conjunction with other classes of parameters, such as the output from the artificial intelligence/machine learning software or repair data. In yet other examples, the live or recorded data obtained from a vehicle can be analyzed in conjunction with other classes of parameters.

Figure 8:
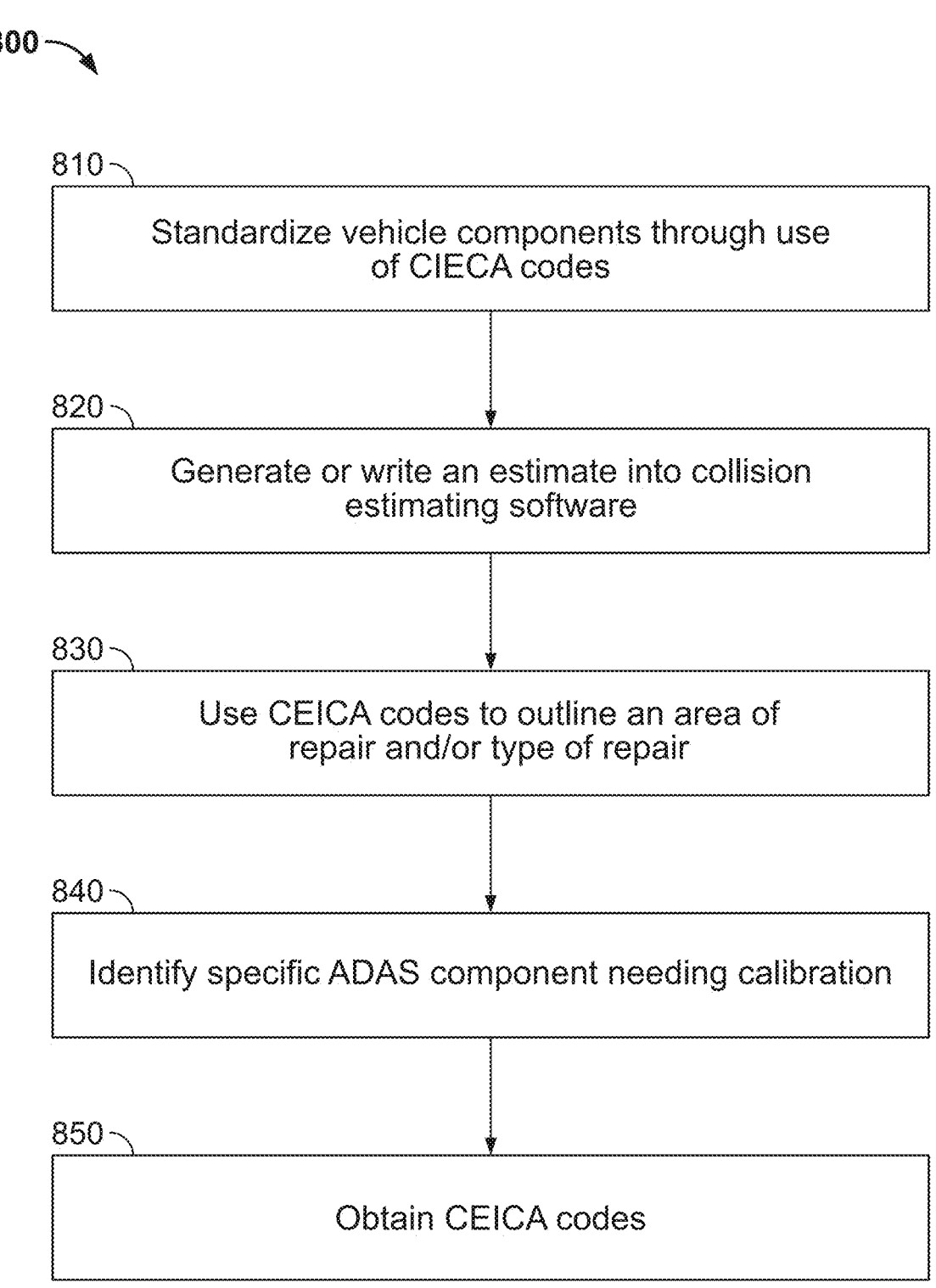
FIG. 8 describes an example of a method related to a "repair side" according to one embodiment of the present invention.

FIG. 8 describes method 800 related to the "repair side" according to aspects of the disclosed technology.

At block 810, vehicle components can be standardized through the use of CIECA codes. While certain codes may be vehicle specific, the use of CIECA codes can generalize the type of repairs done across vehicles.

At block 820, an estimate can be written in a collision estimating software. The collision estimating software can use the CIECA codes to determine the parts which were repaired. In some examples, information can be provided from captured video or images.

At block 830, the CIECA codes can be used to outline an area of repair and the type of repair that was performed on the vehicle.

At block 840, and based on additional vehicle information, the area of repair obtained can identify when an ADAS component will need calibration. As one example, per manufacturer or OEM service information, when, in a particular vehicle (such as when a blind spot radar is mounted to a rear quarter panels of the vehicle under the rear bumper), when the rear bumper is removed the rear blind spot radars must be calibrated. In some examples and in some vehicles, when one radar unit requires calibration, one or more associates radar units must also be calibrated, either independently or in conjunction with calibrating the other radar units. This information can be included or provided to an end user such as on the Operations Console. In some examples, the correlation of one or more radar units can be included as part of a trained machine learning model. In some examples, one or more machine learning models can be trained to scan or decipher OEM service information to generate or understand correlations between vehicle components requiring calibration. In some examples, the correlations can be based on learning from OEM service information from prior model years for a particular make and model of vehicle, which can allow for correlations between vehicle components to be determined, and for new or updated components, or new DTCs in vehicles, to be recognized.

At block 850, the CIECA codes obtained, the area of repair. Specific CIECA codes and their repairs are match and with specific modules from the vehicle. This will determine the calibration needed for the vehicle.

FIG. 9 describes method 900 according to aspects of the disclosed technology.

At block 910, a vehicle can arrive to the shop for repairs. At this step, a pre-scan can be performed on the vehicle.

At block 920, the data that is received can be processed and be transmitted to a server containing the trained machine learning model. In other examples, the data can be locally analyzed by a trained machine learning model and need not be transmitted to a server. In some examples, the data will be sent in a JSON format to a server or local machine.

At block 930, the trained machine learning model can be used to provide as an output for the data obtained. In some examples, a binary classification can be output by the trained machine learning model. The binary classification can include At block 940, a repair estimate can be created and uploaded or provided to a computing device or server for analysis. The repair estimate can be a dynamic document or electronic document which can be configurable, updateable, and be changed. In some examples, as the repair estimate changes, the repair estimate can be uploaded again.

At block 950, the results from the trained machine learning model can be provided to a second server or computing device. In some examples, a console in communication with the second server or computing device can be a device within a repair shop.

At block 960, an end user can review or challenge the results. If a user challenges the results, an indication can be provided to the machine learning model. Additionally, feedback can be provided to the machine learning model that a particular result was inaccurate or a false positive.

At block 970, a console can continue to report the status of the vehicle. The console can, for example, indicate whether a certain DTC code is still present on the vehicle. Further, based on results from models described herein, an indication of whether a calibration is complete, incomplete, or still required can be provided to a user or on a console.

At block 980 data can be retrieved from the console and operational reports can be reported or reviewed to ensure calibration of the vehicle.

Figure 10A:
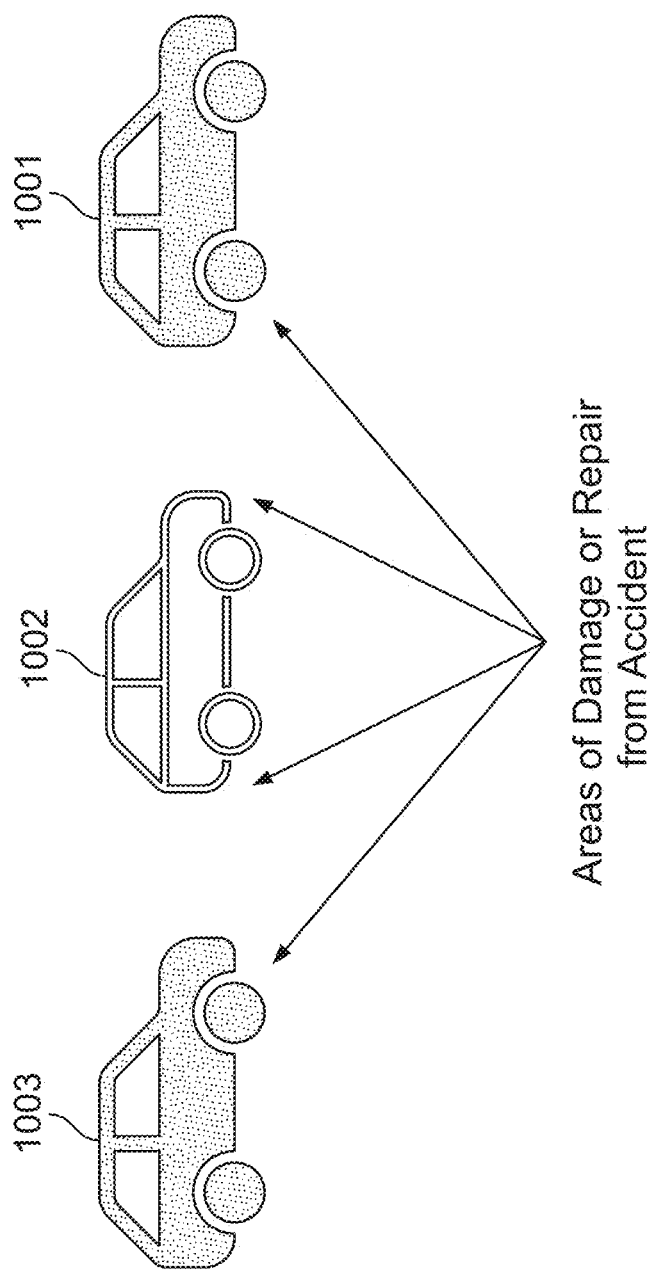

FIG. 10A illustrates an example analysis of an example vehicles 1001, 1002, and 1003 related to aspects of the disclosed technology. Additional examples and aspects of analysis of one or more vehicle components using the methods and techniques described herein are further illustrated with respect to FIG. 10B to FIG. 10F.

Turning to FIG. 10A, as one non-limiting example, vehicles 1001, 1002 and 1003 can be brought to a repair shop after a crash. Vehicles 1001, 1002 and 1003 can contain a plurality of sensors. Following the crash, one or more vehicle areas, such as a front area, side area, bumper area, windshield area, or other area can be identified. The vehicle area may contain one or more sensors which require calibration and are associated with that vehicle area. For example, vehicles 1001, 1002 and 1003 may all contain a front radar, windshield camera, and rear blind spot radar(s). Vehicle 1001 can be for example, a 2020 Ford™ F-150™. Vehicle 1002 can be a 2020 Subaru™ Forester™. Vehicle 1003 can be a 2020 Nissan™ Rogue™. In this example, vehicle 1002, equipped with a front radar windshield camera and rear blindspot radar(s) can be hit in the rear and pushed into a vehicle in front of it, vehicle 1003. A "sandwich" collision may have occurred between the vehicles, where vehicle 1001 struck vehicle 1002 in the rear, and in turn, vehicle 1002 struck vehicle 1003 in the rear. Vehicle 1002 can be sandwiched between vehicle 1001 and vehicle 1003.

As described above, vehicle 1001 may have been equipped with a front radar system. Due to the event which took place, after repair of vehicle 1001, a calibration of the front radar system and the windshield camera system may be required due to the front impact on vehicle 1001 due to front suspension repairs. Further, the rear blind spot radar(s) may only require a "check" procedure rather than an entire calibration due to the operational parameters designed by the manufacturer.

Vehicle 1002, as described above, may be a 2020 Subaru™ Forester™. Due to the incident with this vehicle, after calibration of the front and rear parts of the vehicle, calibration of the windshield camera system due to the front suspension repairs and the rear blind spot system due to the repair of the rear bumper or rear quarter panel would require the removal of the blind spot radar units.

Vehicle 1003 may be a 2020 Nissan™ Rogue™. In the example described, as vehicle 1003 was forwardmost, vehicle 1003 would only be hit in the rear. After repair of vehicle 1003, a check procedure for the rear blind spot radar system would be required. Due to the specific design of this system by the manufacturer of vehicle 1003, a check procedure, rather than a calibration, of the rear blind spot radar system would be required. Further, as an example, a pre-scan of vehicle 1003 would indicate a DTC for the front radar system (DTC C1A16). This DTC, per manufacturer specifications, directly mandates a replacement of the front radar unit if another DTC, DTC U1000, is not present. In this example, DTC U1000 may be absent. Thus, due to the replacement of the front radar unit, a calibration of the new unit is required even though this event does not directly relate to the necessary repair.

Figure 10B:
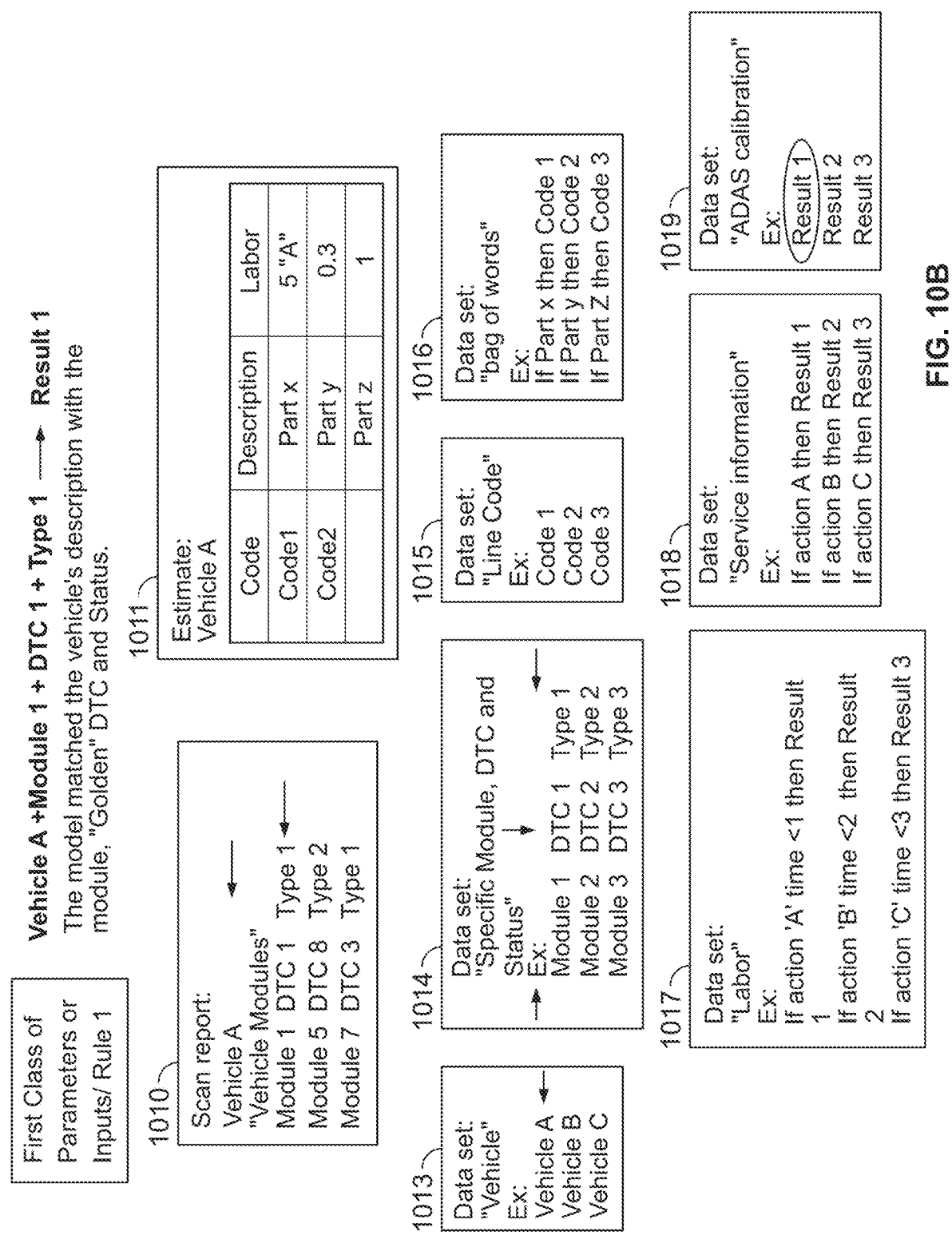

FIG. 10B illustrates additional aspects of the disclosed technology according to example embodiments. As can be appreciated from FIG. 10B, a first class of parameters or inputs, as described above, also described as "rule 1" in FIG. 10B can be used to analyze aspects of Vehicle A. As illustrated in FIG. 10B in broad overview, vehicle A can be scanned through an OBD port. Upon scanning vehicle A, data obtained from the scan can be sent to cloud platform 320 referenced in FIG. 3. Scan report 1010 referenced in FIG. 10B can provide a list of vehicle modules or components, related DTCs, and types or status of the DTC. Additionally, an estimate 1011 can be created by a repair shop related to the vehicle. FIG. 10B further illustrated a number of example data sets which can be used by in the analysis of vehicle A. For example, dataset 1015 can be made of line codes or CIECA codes obtained during the scan of a vehicle. Another dataset can be made of a "bag of words" or other information related or obtained from estimate 1011, or other repair information or repair orders. Data set 1017 can for example be the labor estimates or labor used in a particular repair, such as that includes in estimate 1011. Additional logic or rules can be obtained or generated related to dataset 1017. Dataset 1018 can be related to "service information" such as that information obtained from an OEM repair manual from the manufacturer of vehicle A. Dataset 1019 can be a set of outcomes from analysis of vehicle A.

In the specific non-limiting example illustrated in FIG. 10B, the machine learning model or other analysis modules can, based on the data obtained, analyze that for vehicle A (including the modules detected by the scan, the type of DTC, and the status or "type" of DTC code), the conditions for a golden DTC are met and provide a result 1. While other information can be used in analysis of vehicle A, due to the presence of the data outlined with an arrow in FIG. 10B, result 1, in dataset 1019, would be obtained. In other examples, feedback from a user can be used for iterative learning to further improve predictions or reduce false negatives.

Figure 10C:
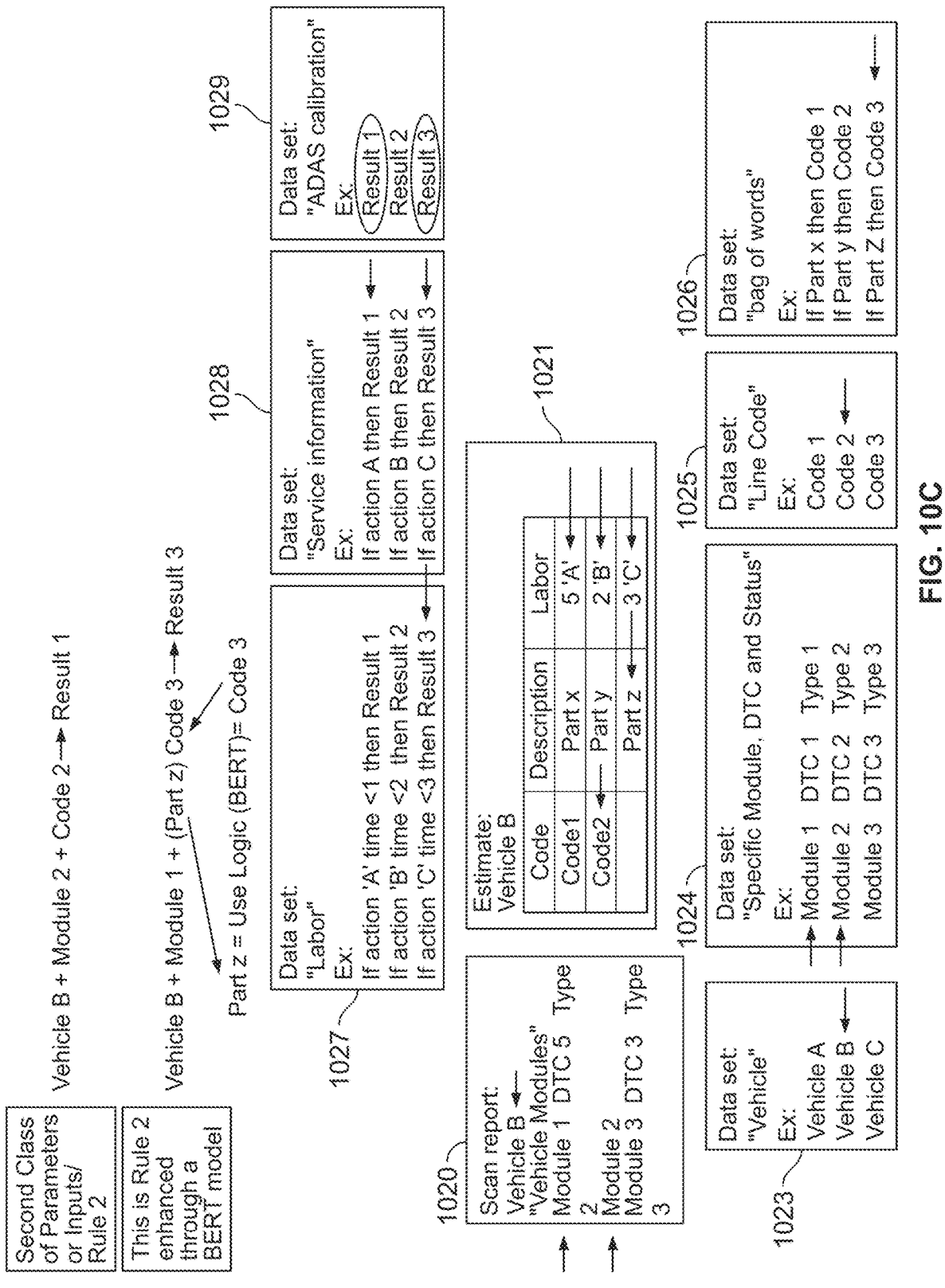

FIG. 10C illustrates additional aspects of the disclosed technology according to example embodiments. In FIG. 10C, analysis of vehicle B is illustrated. As illustrated in FIG. 10C, two results can be obtained in connection with the analysis of the vehicle. Similar to the process described in FIG. 10B, the vehicle can be scanned to generate a scan report 1020. Scan report 1020 can contain a number of modules and associated information. FIG. 10C also illustrates an estimate 1021 which can be similar to estimate 1011 or estimate 1300 illustrated with respect to FIG. 13. FIG. 10C also illustrates a data sets 1023-1029, which can be used in the analysis of vehicle B. Data sets 1023-1029 can be obtained or generated from other datasets obtained from vehicle B (such as scan report 1020 or estimate 1021) or obtained from analysis of other information related to vehicle B (such as OEM service information, repair information, recall information, model information, or specific parts data). Data set 1029 can be a set of possible outcomes for one or more vehicle components or parts to be repaired. While the data sets are illustrated in broad overview in FIG. 10C, the examples provided in, for example, data sets 1025-1028 can be weighted, probabilistic in nature, or combined for confirmation. In some examples, the particular examples can be obtained or are the result of training one or more machine learning models. In other examples, the rules can be part of a neural network, such as one illustrated in FIG. 12, and be probabilistically combined in generation of one or more outcomes.

In the specific non-limiting example illustrated in FIG. 10C, two "results" can be obtained. As a specific example, a second class of parameters or inputs, such as those described above, can be used to obtain the results. In this specific example, while a scan of vehicle B resulted in identification of car modules (e.g. module 2 in scan report 1020), no DTC or status matched that specific module. Similarly, while module 3 in scan report 1020 may have indicated a specific DTC (e.g. DTC 3), and a DTC type, that DTC may not have met the parameters for analysis by a first class of parameters or by rule 1. Thus, with respect to module 2, a machine learning model or other analysis model can use information related to that module obtained in estimate 1021, such as a line code. Other additional information, such as an action taken, a description of the code or parts used in connection with that module, or the labor inputted into the estimate can be used in analysis of the vehicle. The model can, based on a weighted machine learning model, generate result 1, circled in dataset 1029. In broad overview, the combination of vehicle B, module 2, and code 2, and/or other information can allow a machine learning model or other analysis model or module to indicate that the calibration required is "result 1."

In connection with result 3, a third class of parameters can be used, such as those described above. The third class of parameters can be related to rule 2 or a second class of parameters. and be generated or related to a "bag of words" or other natural language processing machine learning techniques. As a specific non-limiting example, while a scan of vehicle B may indicate the presence of module 1 for example, no code or status may be associated with that specific code. Further, in connection with "part z" in estimate 1021, no line code or CIECA code may be entered in the estimate. As no line code or CIECA code was entered, a BERT or other natural language processing model may look at the data sets related and make a prediction for a particular code and create a line code or CIECA code. Further, the model may use a second class of parameters or rule 2 to further analyze the generated CIECA code in conjunction with other data, such as for example, the labor required.

FIG. 10D illustrates additional aspects of the disclosed technology according to example embodiments. FIG. 10D illustrates analysis of vehicle C. In this example, vehicle C may require no calibration despite requiring repairs. In this particular example, the machine learning model may determine that based on the inputs, no repair or calibration is required. In some examples, this "no calibration" outcome may be a false negative. FIG. 10D illustrates with arrows various types of data used in making this determination. In the illustrated non-limiting example, as the labor related to code 1 was less than "0.5", rules defined in dataset 1037. "Result 1" in this case may be an indication of a "null" set which indicates that no calibration is required.

FIG. 10E illustrates additional aspects of the disclosed technology according to example embodiments. FIG. 10E illustrates analysis of vehicle C in a probabilistic manner. In FIG. 10E, vehicle C's modules may be identified, but no DTCs or status may match parameter 1 or rule 1. Similarly, a line code may not be entered into estimate 1041, and a description of the work performed on the vehicle may be so vague that it does not consistently generate an accurate line code or CIECA code from a "bag of words." A model can be used to predict or probabilistically generate a line code or CIECA code, which can in turn be used to predict one or more vehicle components which require calibration.

In FIG. 10E, a machine learning model may attempt to analyze based on information contained in estimate 1041. Estimate 1041 may contain information which is incomplete or misspelled for a BERT or other model to create a CIECA or line code. For example, estimate 1041 may only indicate that the repair performed on vehicle C was for a "bumper" without additional information, such as whether the bumper was a "front bumper" or "rear bumper." In this example, additional information may be obtained from other data in the additional estimate lines in 1041. For example, estimate 1041 may indicate that a "spoiler" was used in the repair, and that part of the repair contained "paint." In some examples, the presence of "spoiler" may weigh information related to "bumper" to more likely be a rear bumper. In other examples, the model may further be refined or more closely trained to incorporate additional information or more granular information related to the "spoiler" such as other parts associated with the spoiler, such as time associated with the labor of installing the spoiler, the number or types of screws associated with the spoiler, or specific part number. Additionally, other work performed, such as the activity of "paint" may be used and weighted. In some examples, the weighting may take place using a neural network, such as network 1200 illustrated with respect to FIG. 12. In some examples, the machine learning model may only provide a result upon reaching a threshold likelihood or probability to avoid excessive false positives or incorrect predictions.

Figure 10F:
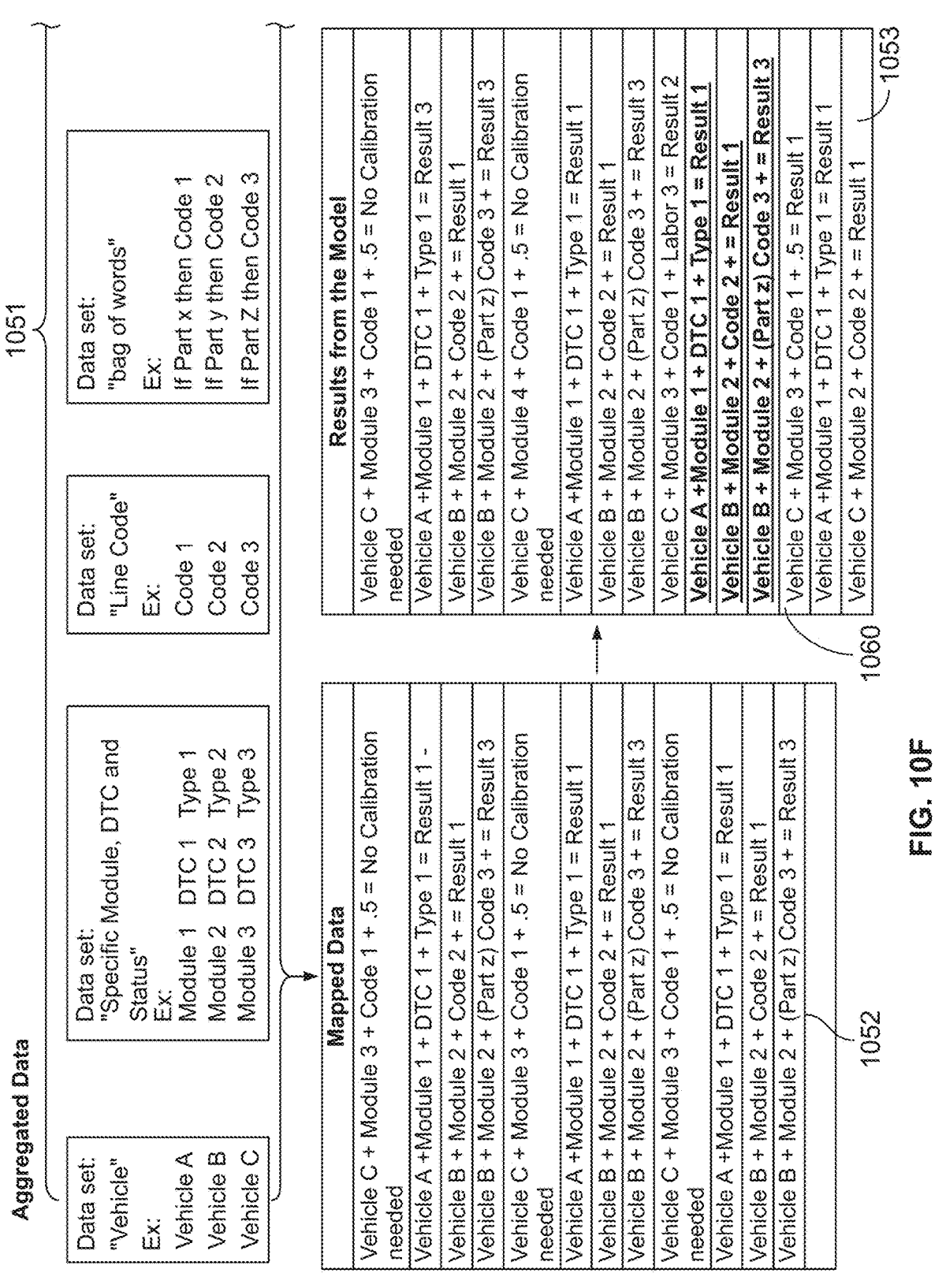

FIG. 10F illustrates additional aspects related to training one or more machine learning models or analysis modules. In some examples, a supervised or semi-supervised training technique may be used. Illustrated in FIG. 10F is an exemplary and non-exhaustive list of training data sets on which a model may be trained, data sets 1051. Any machine learning training or analysis module training techniques can be used to analyze data sets 1051 to generate a set of mapped data, set 1052. Set 1052 can contain "rules" which can be used to analyze a vehicle. While set 1052 is expressed as "rules," set 1052 can more broadly express relationships between various datapoints which can be used for analysis. In some examples, the "rules" may be probabilistic in nature and reflect a probable outcome. In other examples, the "rules" may be outcomes of a clustering algorithm to reflect the most probabilistic outcome.

Table 1053 provides a schematic interface or overview of reviewing the results obtained from the machine learning model. In this example, table 1053 may provide a number of "rules" or correlations between data inputs to provide outcomes, which can be verified or modified by a subject matter expert. In some examples, a second machine learning model, acting as a subject matter expert, can supervise or train the machine learning model or analysis model being trained. In some examples, such as those underlined in FIG. 10F, certain results can be provided as being "failed" or "false positives", which can then be removed from 1052 as a "rule." In other examples, the machine learning model may provide "rules" which can be added to mapped data 1052 upon verification. In some examples, the "learning" from a particular set of data can be genericized. For example, in row 1060 the result may be genericized to cutoff for a particular model year of a vehicle. For example, it may be determined that despite having a certain module, such as a cruise control module, no ADAS sensors were present in a vehicle. For example, any Lexus-vehicle prior to model year 2003 may not contain an ADAS sensor. Thus, a rule can be genericized to indicate that no calibration is required upon detection of a cruise control module DTC code when the year is prior to 2003 and the model is a Lexus™. In some examples, such as those related to a neural network, a weight of "0" can be provided to any year prior to 2003, to nullify or negate the results otherwise obtained from a "rule."

Other examples can include more granular information, such as the particular manufacturer of vehicle parts, recalls of particular vehicle parts (e.g. airbags), the year a vehicle component was manufactured. In other examples, any set of data which is obtainable from the vehicle can be used. For example, in an electric or hybrid vehicle, one or more sensor data related to an electric battery can be used. In some examples, training can be iterative to genericize the "rules" described. In other examples, upon obtaining more than a threshold number of false positives from a particular rule, a flag or indication can be provided to retrain the model, with, for example, more granular rules. In some examples, "failed" can be provided to indicate that the "rule" created or used was providing the incorrect result and should be removed or the machine learning model should be appropriately trained, such as a false positive. "Incorrect" may imply that a prediction or suggestion from a machine learning model was incorrect, and that such a prediction, rule, or suggestion should not be added to a corpus of the trained machine learning model.

Table 1054 lists updated mapped data or correlations or "rules" based on the feedback obtained in table 1053. Rows with underlined and italicized data contain new "rules" or correlations based on user feedback. In some examples, additional rules can be synthesized from a set of rules added through a machine learning model.

In some examples, no "rule" may exist for a particular combination of data obtained from a vehicle. In such examples, the model may be retrained to look for correlations or trained on a new, modified, or augmented data set. For example, using the data available, hidden correlations between the data can be examined. In other examples, the model can be trained on additional synthesized data to further allow for deeper levels of machine learning.

Figure 11:
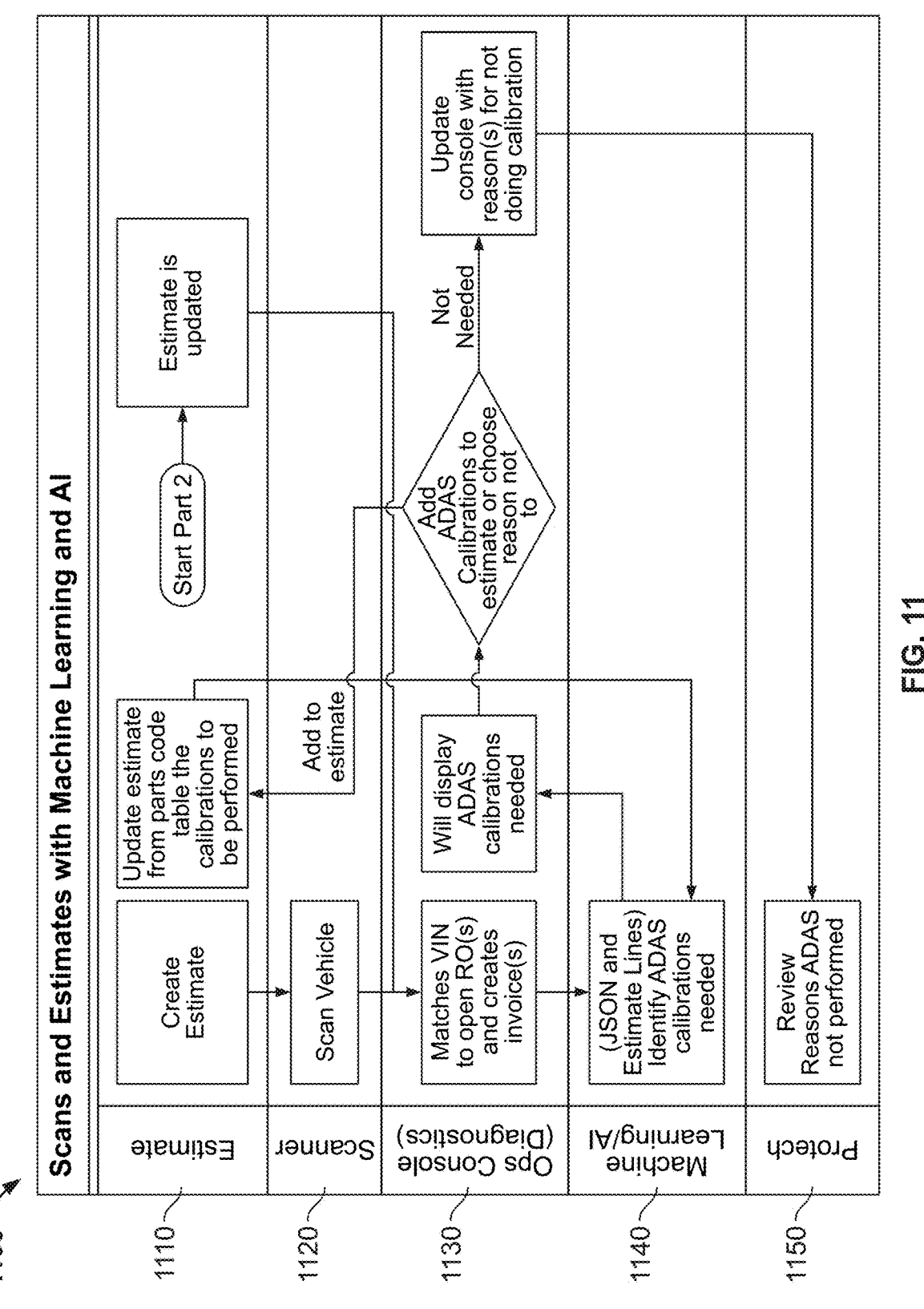
FIG. 11 illustrates an example analysis framework according to one embodiment of the present invention.

FIG. 11 illustrates an example method 1100 according to aspects of the disclosed technology. FIG. 11 illustrates aspects related to estimating or obtaining which sensors in a vehicle require calibration. While the flow of information illustrated in method 1100 is one embodiment, a person of skill in the art will appreciate that other permutations of obtaining and analyzing information can be used.

Figure 13A:
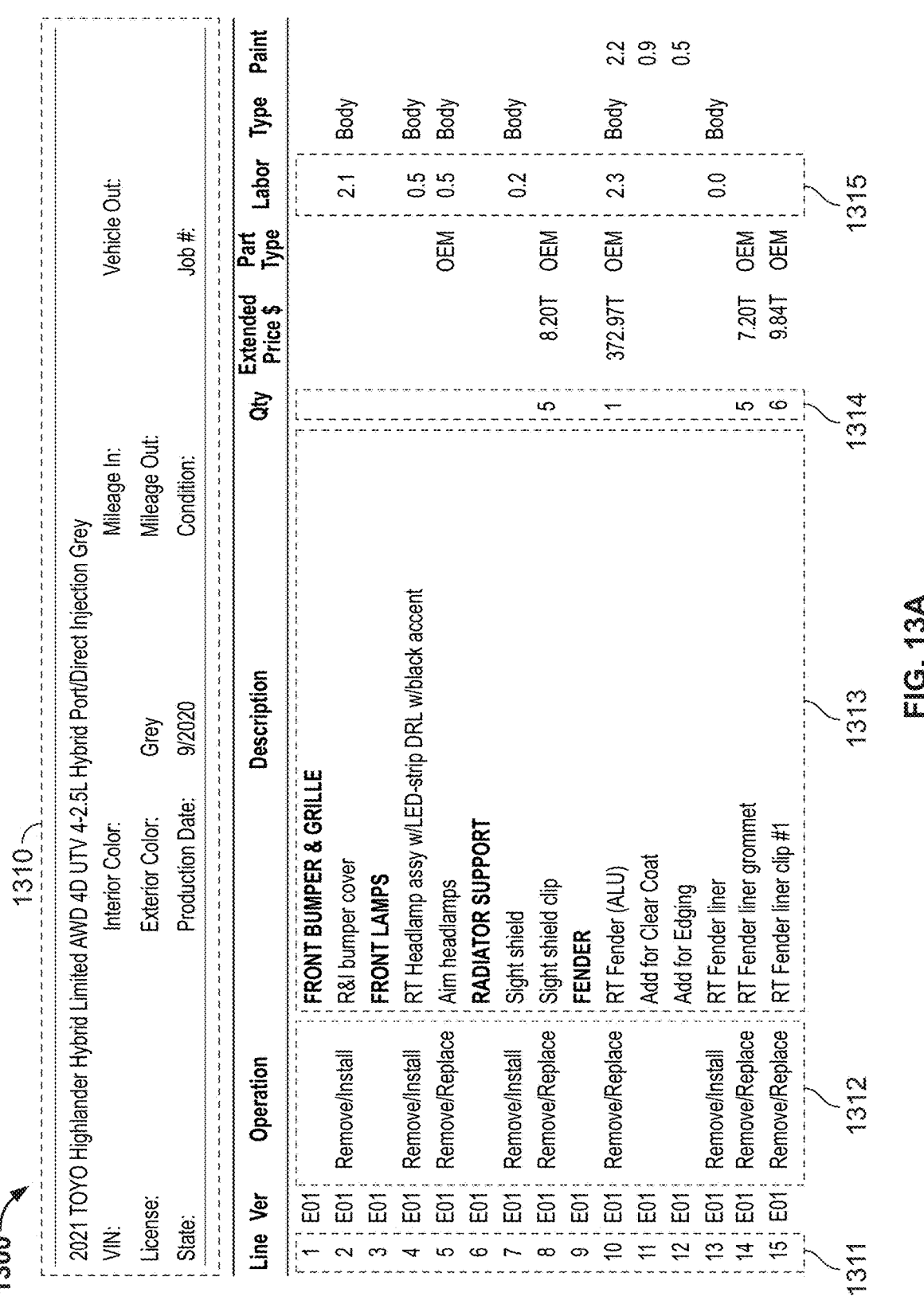

At block 1110, an estimate can be obtained. At this block an estimate related to a vehicle to be calibrated can be obtained. An estimate can be any documentation related to any services performed on a vehicle, such as without limitation, an alignment done by a third party, a repair bill, an insurance estimate, a police report, an image of the vehicle. FIGS. 13A and 13B illustrates an example estimate.

At block 1120, the vehicle can be scanned using a scanning device. Information can be obtained at this block as described herein.

At block 1130, a console or dashboard can be used to obtain information about the vehicle. At this block, any identification of the vehicle can be obtained, and cross-reference with any existing repair orders or existing invoices.

At block 1140, machine learning and artificial intelligence techniques or methods can be used as part of the analysis. In some examples, any of the techniques used herein can be used to evaluate and identify which ADAS calibrations may be required. ADAS calibrations may include sensor calibration or related module calibration. ADAS calibration can also further include static or dynamic calibrations. From block 1140, information can be outputted back to block 1130.

Turning back to block 1130, the information obtained from block 1140 can be displayed on a console to indicate which calibrations are required. The calibrations can be selected and added to a repair estimate or repair order for a technician to perform, as indicated by the link between block 1130 and block 1110. If it is decided that the calibrations are not required, the reasons for the same can be provided, and this information can be saved, and outputted to block 1150, where a supervisor can review the same. An example display is illustrated with respect to FIG. 14.

Turning back to block 1110, the estimate can be updated from a parts code table, or other database, to indicate which calibrations are to be performed and on which specific sensors. After these calibrations are performed, the estimate can be updated, and the process can be repeated to ensure that no additional calibrations are required.

Figure 12:
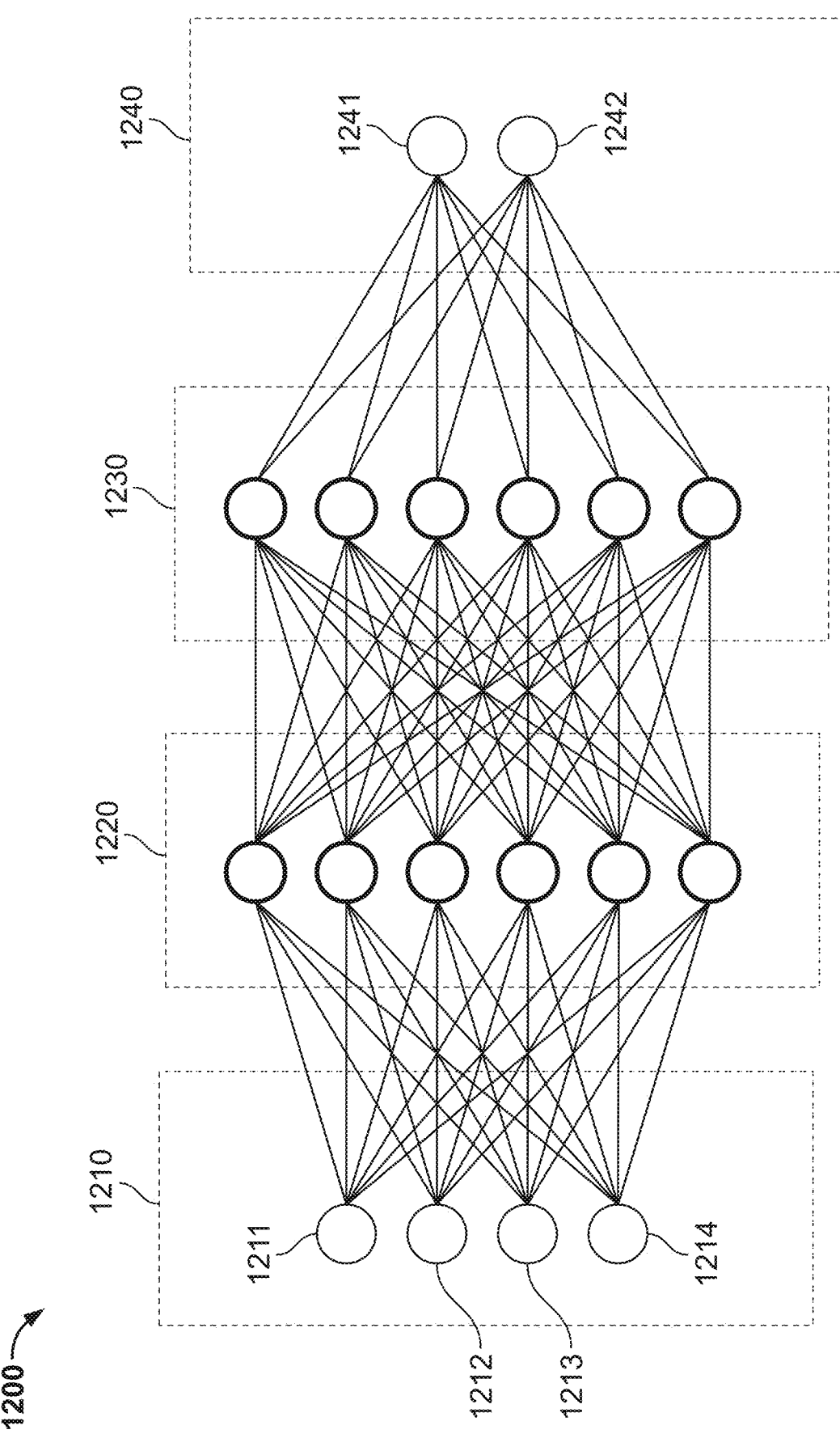
FIG. 12 illustrates an example neural network according to one embodiment of the present invention.
Figure 13A:
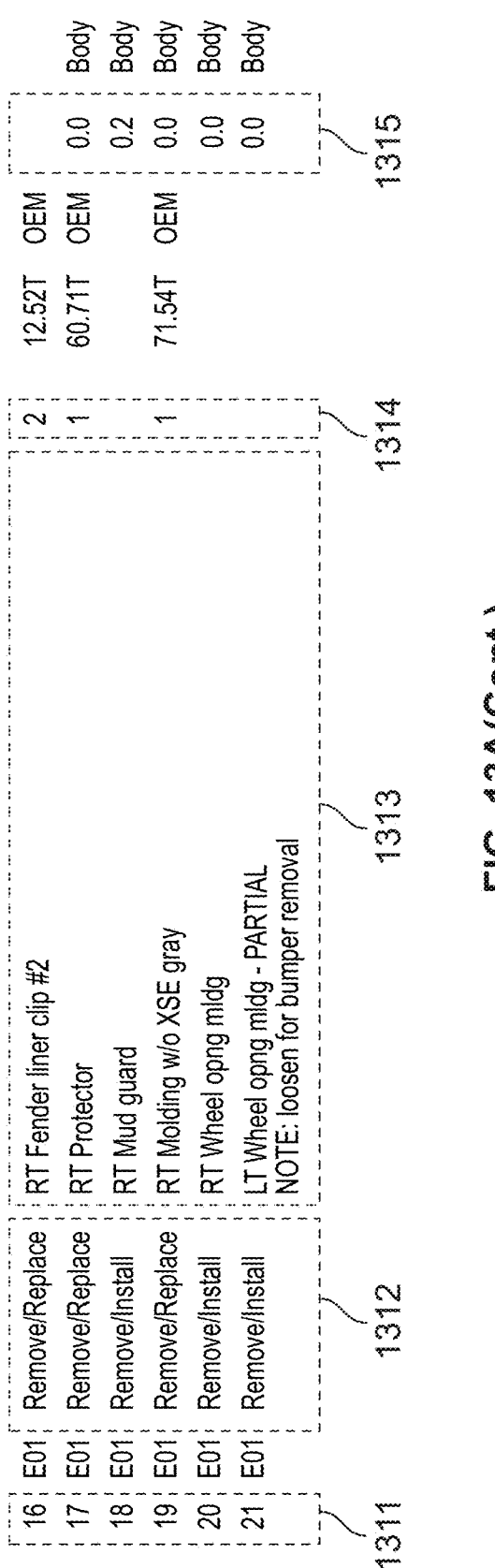

FIG. 12 illustrates an example neural network 1200 according to aspects of the disclosed technology. Neural networks and deep learning techniques can also be used for the techniques described above. Neural networks generally attempt to replicate the behavior of biological brains in turning connections between an input and output "on" or "off" in an attempt to maximize a chosen objective. In some examples, relationships between the three classes of parameters may depend on neural networks, wherein the use of the neural network may increase or decrease the predictive power between the rules.

Network 1200 has a plurality of "layers" each containing neurons, such as layers 1210, 1220, 1230, and 1240. Layer 1210 can be an input layer, layers 1220 and 1230 can be intermediate or hidden layers, while layer 1240 can be an output layer. Each layer can be comprised of a plurality of endpoints. For example, layer 1210 contains endpoints 1211-1214. Each layer can be connected to one another through "neurons" or connections from an endpoint in that layer to an endpoint in the subsequent or following layer.

Each endpoint may have a plurality of neurons or connections to the next layer. Each connection can be weighted with a fixed or dynamic weight based on training from any machine learning training technique. Each point within the neural network can analyze the information it obtains and further output information to the next stage of neurons. In this manner, a plurality of analysis techniques and specific machine learning models can be used in the analysis.

Endpoints 1211-1214 can input data or types of data. For example, endpoint 1211 can input data related to a first class of parameters, such as DTCs from a vehicle; endpoint 1212 can input information obtained from repair estimates, repair documentation, or other information generated or created by technicians or mechanics; and endpoint 1213 can input information related to a vehicle. Endpoint 1214 can input specific rules or other information related to how the information is analyzed.

As one specific example, a neural layer or weight on an edge can analyze or weigh information related to the type of labor code used in a repair estimate, the amount of hours used in a particular repair, or the cost of the repair. Such information can be used to negate or nullify the effect of an analysis by a previous layer or next layer, or other endpoint. For example, if it is believed that a calibration must be done due to a "front windshield" related information in a repair estimate, but only a small check on the windshield was performed, an intermediate neural layer can negate a result which would otherwise indicate that a front camera calibration would be required. In this manner, the number of false positives can be reduced. As another example, if a back bumper is only painted, but not otherwise repaired, an indication or result from a machine learning model or other analysis module can be negated as the bumper may not have been meaningfully damaged.

Information from the endpoints can be analyzed in multiple steps, and progress through the layers sequentially. In some examples, the weight of neurons between the layers can indicate the value or importance to give to a specific piece of information. In other examples, the weights can be dynamic based on information or other data obtained at endpoint 1214. For example, for a specific make or model, the weighting of the neurons may be different as compared to another make or model. In yet other examples, a plurality of neural networks can be stored and selected from automatically based on the specific make, model, or year of a vehicle. In yet other examples, confidence values can be used in determining whether a specific output from a neuron should be used or not.

Endpoints 1241 and 1242 in layer 1240 can provide one or more outputs following analysis by the neural network. In some examples, the outputs can specify whether a calibration is required or not, or what area of a vehicle requires a calibration.

FIGS. 13A and 13B illustrate an example estimate or repair order 1300 according to example embodiments. Repair order 1300 may consist of identifying information of the vehicle in header 1310. The repair order may also consist of a number of columns organizing the information. For example, FIGS. 13A and 13B illustrate columns 1311, 1312, 1313, 1314, and 1315, which can be columns related to lines, operations performed, description of an operation performed, quantity of parts, and the amount of labor expended on an operation. Additional information may be present in additional columns. The repair order may include information detailing the vehicle being repaired, its VIN or other identifying information, production date, operations performed, description of work performed, quantity of parts used, price of a repair, the labor "amount" or time spent on a vehicle, the type of operation performed, and whether cosmetic or other work was done to the component. In some examples, each line of repair order 1300 can be considered to be an estimate. In some examples, comments can be added to any particular line which can be used in training of a machine learning model. For example, line 21 indicates that "wheel ong mldg—partial" and the reason for the task—loosening for bumper removal. In some examples, a trained machine learning model can use this information in determining a particular vehicle component to be calibrated. In other examples, certain information can be cleaned before processing by a machine learning model. For example, line 4 in FIG. 13A indicates "w/black accent" and this cosmetic information may not be relevant in determining what needs to be repaired or calibrated.

FIG. 14 illustrates an example console display 1400 according to an example embodiment. FIG. 14 also illustrates columns 1410, 1420, 1430, and 1440. Column 1410 can have information related to a "center name" or a repair shop. Column 1420 may have information identifying a particular repair order. Column 1430 contains a list of calibration requirements for a vehicle. Column 1440 displays the particular vehicle related to a repair order. Display 1400 may be presented to an end user and indicate, for one or more vehicles, the calibration requirements of the vehicle. For example, an "X" may indicate that a calibration is required, while a checkmark may indicate that the required calibration is diagnosed and currently a part of a service request. In other examples, "no calibration required" can be displayed. Display 1400 may be interactive and allow for a user to provide feedback which may be returned to an analysis module or machine learning model for iterative learning.

In some examples, the neural network, or other machine learning models can incorporate one or more of the following methods or techniques. A person of skill in the art will appreciate that variations of these methods and techniques can be used. In some examples, a BERT Model can be used. In other examples, a XG-Boost model can be used. In some examples, the BERT model uses parameters designated to a manual input of an estimate line to assign a CIECA code when one is not provided. This model learns by reading the semantics of an estimate line and comparing it to the historical knowledge used to train it to make a prediction regarding an absent CIECA code.

In some examples, an XG-Boost model can be used. The XG-boost model can take all the parameters and can make a calibration prediction the end user sees. By using all the training data and learning as it makes correct predictions this model analyzes all estimate lines to make the most accurate prediction possible. As predictions are made, it has a percentage likelihood of being correct; the results are determined by a threshold of prediction accuracy and can be adjusted to determine the outcome of true vs. false results. In some examples, probabilistic methods can be used. For example, a Gaussian mixture model can be used. Gaussian mixture models are a probabilistic model for representing normally distributed subpopulations within an overall population. In some examples, a mix of supervised learning techniques and unsupervised learning techniques can be used. In some examples, machine vision methods and techniques can be used for identification of clusters or classifications. In some examples, clustering methods can be used. Clustering can be an unsupervised machine learning technique in which the algorithm can define the output. One example clustering method is "K_Means" where K represents the number of clusters that the user can choose to create. Various techniques exist for choosing the value of K, such as for example, the elbow method. Some other examples of techniques include dimensionality reduction. Dimensionality reduction can be used to remove the amount of information which is least impactful or statistically least significant. Ensemble methods can be used, which primarily use the idea of combining several predictive models, which can be supervised ML or unsupervised ML to get higher quality predictions than each of the models could provide on their own. As one example, random forest algorithms may be used.

While this disclosure contains many specific implementation details, these should not be construed as limitations on the scope of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

The operations described in this specification can be implemented as operations performed by a data processing apparatus on data stored on one or more computer-readable storage devices or received from other sources. The operations may be executed within the native environment of the data processing apparatus.

A computer program (which can be a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers or vehicle communication interfaces.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

Without limiting the foregoing description, certain embodiments of the disclosed technology can include one or more or any combination of the following features:

Feature 1. A method of determining calibration needs for a vehicle, the method comprising:

receiving, from a scan tool a first diagnostic code;

analyzing, using a first class of rules, the first diagnostic code;

analyzing, when a first condition based on the first class of rules is not met, a repair order associated with the vehicle with a second class of rules; and generating as an output a vehicle sensor which requires calibration.

Feature 2. The method of feature 1 wherein the repair data is analyzed using a machine learning model to obtain a first line code.

Feature 3. The method of any of features 1-2 wherein the second class of rules is created based on an analysis of repair information.

Feature 4. The method of any of features 1-3 wherein the repair data further contains at least one of (i) time spent on a task and (ii) cost of a particular task.

Feature 5. The method of any of features 1-4 wherein the repair data is further analyzed by weighing at least one of (i) time spent on a task and (ii) cost of a particular task in generation of the first line code, to generate a first weight.

Feature 6. The method of any of features 1-5 wherein the first weight is different than an output from the trained machine learning model.

Feature 7. The method of any of features 1-6 wherein the first weight is generated based on supervised machine learning or manually set by a human operator.

Feature 8. The method of any of features 1-6 wherein the first weight is generated by the machine learning model.

Feature 9. The method of any of feature 2 wherein the machine learning model is a natural language processing model.

Feature 10. The method of any of feature 9 wherein the machine learning model is trained using an XGBoost method.

Feature 11. The method of any of features 1 wherein the first diagnostic code is analyzed against a list of Golden DTCs.

Feature 12. The method of any of features 1-11 wherein the Golden DTCs are manually tagged by a human operator.

Feature 13. The method of any of features 1-11 wherein diagnostic trouble codes for a vehicle are classified as Golden DTCs using a machine learning model.

Feature 14. The method of any of features 1-13 wherein the machine learning model is a binary classification model.

Feature 15. The method of any of features 1-13 wherein the machine learning model is one of clustering model.

Feature 16. The method of any of features 1-15 wherein the machine learning model is one of a density-based, distribution based, centroid based, k-means clustering, DBSCAN, and spectral clustering model.

Feature 17. A method for determining calibration needs for vehicles, the method comprising:

receiving, from a scan tool a first diagnostic code;

analyzing, using a natural language processor, a first set of vehicle areas from either the first diagnostic code or repair estimate;

outputting, using a trained machine learning model, a second set of vehicle areas, the second set of vehicle areas probabilistically linked to the first set of vehicle areas;

generating, using a second trained machine learning model, a set of vehicle components for calibration;

outputting, from the trained machine learning, a binary classification of vehicle components already calibrated; and providing, to an end-user in a human readable format, the binary classification.

Feature 18. The method of any of feature 17 comprising receiving an indication of a false negative.

Feature 19. The method of feature 18 comprising re-training the trained machine learning model upon receiving a threshold level of false negatives.

Feature 20. The method of any of features 17-18 wherein the machine learning model is a clustering model.

Feature 21. The method of any of features 17-20 wherein the clustering model is one of a density-based, distribution based, centroid based, k-means clustering, DBSCAN, and spectral clustering model.

Feature 22. The method of any of features 17-21 wherein the machine learning model is part of a node within a neural network.

Feature 23. A method of determining calibration needs for a vehicle, the method comprising:

receiving, a first repair order or estimate related to the vehicle, analyzing the first repair estimate to generate one or more line codes;

analyzing the line codes against the repair order to generate an area of vehicle repair;

based on the vehicle repair area and module information about the vehicle, generating a list of vehicle sensors for calibration.

Feature 24. A method of analyzing a vehicle using a neural network, the method comprising:

receiving, at a first layer of a neural network, a first set of parameters related to the vehicle;

receiving, at a first intermediate layer, first weighted parameters related to the vehicle, the first weighted parameters weighed by the neural network;

analyzing, at the first intermediate layer, the first weighted parameters to generate a second set of parameters;

receiving, at a final layer the second set of parameters; and analyzing at the final layer the second set of parameters to output a list of vehicle sensors for repair.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of determining calibration needs for a vehicle, the method comprising:

receiving, at a computer system comprising a processor and memory, scan data for the vehicle, from a scan tool comprising an interface configured to communicate to an on-board diagnostic system of the vehicle, the scan data comprising one or more diagnostic codes, the diagnostic codes having respective types, and one or more module identifiers;

receiving, at the computer system, estimate data for the vehicle, the estimate data comprising one or more line codes corresponding to a repair order for the vehicle;

analyzing the scan data, using a first class of rules based at least in part on the diagnostic codes, the respective types of the diagnostic codes, and the module identifiers, to determine whether a first condition is met, the first condition corresponding to a result identifying a component of the vehicle requiring calibration;

analyzing the scan data, when it is determined that the first condition based on the first class of rules is not met, using a second class of rules based at least in part on the line codes of the repair order associated with the vehicle to determine whether a second condition is met, the second condition corresponding to a result identifying a component of the vehicle requiring calibration; and generating an output identifying one or more vehicle components requiring calibration based on the result of the first condition or the second condition, wherein said analyzing the scan data using the first class of rules comprises comparing the diagnostic codes of the scan data to a defined group of specific diagnostic trouble codes (DTCs) picked as analysis model parameters and designated as golden DTCs for the vehicle, and wherein the first condition is met upon the scan data matching one of a set of defined combinations of: a golden DTC for the vehicle, a corresponding diagnostic code type, and a corresponding module identifier.

2. The method of claim 1 wherein the repair order is analyzed using a machine learning model to obtain a first line code.

3. The method of claim 2 wherein the second class of rules is created based on an analysis of repair data.

4. The method of claim 3 wherein the repair data comprises at least one of (i) time spent on a task and (ii) cost of a particular task.

5. The method of claim 4 wherein the repair data is further analyzed by weighing at least one of (i) time spent on a task and (ii) cost of a particular task in generation of the first line code, to generate a first weight.

6. The method of claim 5 wherein the first weight is different than an output weight from the trained machine learning model.

7. The method of claim 6 wherein the first weight is generated based on supervised machine learning or manually set by a human operator.

8. The method of claim 6 wherein the first weight is generated by the machine learning model.

9. The method of claim 2 wherein the machine learning model is a natural language processing model.

10. The method of claim 9 wherein the machine learning model is trained using an XGBoost method.

11. The method of claim 1, wherein the Golden DTCs are manually tagged by a human operator.

12. The method of claim 1, wherein diagnostic trouble codes for a vehicle are classified as Golden DTCs using a machine learning model.

13. The method of claim 12 wherein the machine learning model is a binary classification model.

14. The method of claim 12 wherein the machine learning model is a clustering model.

15. A system for determining calibration needs for a vehicle, the system comprising:

a computer system having one or more processors in communication with a memory, the memory storing instructions executable by said one or more processors to perform:

receiving, at the computer system, scan data for the vehicle, from a scan tool comprising an interface configured to communicate to an on-board diagnostic system of the vehicle, the scan data comprising one or more diagnostic codes, the diagnostic codes having respective types, and one or more module identifiers;

receiving, at the computer system, estimate data for the vehicle, the estimate data comprising one or more line codes corresponding to a repair order for the vehicle;

analyzing the scan data, using a first class of rules based at least in part on the diagnostic codes, the respective types of the diagnostic codes, and the module identifiers, to determine whether a first condition is met, the first condition corresponding to a result identifying a component of the vehicle requiring calibration;

analyzing the scan data, when it is determined that the first condition based on the first class of rules is not met, using a second class of rules based at least in part on the line codes of the repair order associated with the vehicle to determine whether a second condition is met, the second condition corresponding to a result identifying a component of the vehicle requiring calibration; and generating an output identifying one or more vehicle components requiring calibration based on the result of the first condition or the second condition, wherein said analyzing the scan data using the first class of rules comprises comparing the diagnostic codes of the scan data to a defined group of specific diagnostic trouble codes (DTCs) picked as analysis model parameters and designated as golden DTCs for the vehicle, and wherein the first condition is met upon the scan data matching one of a set of defined combinations of: a golden DTC for the vehicle, a corresponding diagnostic code type, and a corresponding module identifier.

16. The system of claim 15, wherein the second class of rules is created based on an analysis of repair data.

17. The system of claim 15, wherein diagnostic trouble codes for a vehicle are classified as Golden DTCs using a machine learning model.

18. A non-transitory computer-readable medium storing instructions that, when executed by one or more processors of a computer system, cause said one or more processors to perform a method of determining calibration needs for a vehicle, the method comprising:

receiving, at the computer system, scan data for the vehicle, from a scan tool comprising an interface configured to communicate to an on-board diagnostic system of the vehicle, the scan data comprising one or more diagnostic codes, the diagnostic codes having respective types, and one or more module identifiers;

receiving, at the computer system, estimate data for the vehicle, the estimate data comprising one or more line codes corresponding to a repair order for the vehicle;

analyzing the scan data, using a first class of rules based at least in part on the diagnostic codes, the respective types of the diagnostic codes, and the module identifiers, to determine whether a first condition is met, the first condition corresponding to a result identifying a component of the vehicle requiring calibration;

analyzing the scan data, when it is determined that the first condition based on the first class of rules is not met, using a second class of rules based at least in part on the line codes of the repair order associated with the vehicle to determine whether a second condition is met, the second condition corresponding to a result identifying a component of the vehicle requiring calibration; and generating an output identifying one or more vehicle components requiring calibration based on the result of the first condition or the second condition, wherein said analyzing the scan data using the first class of rules comprises comparing the diagnostic codes of the scan data to a defined group of specific diagnostic trouble codes (DTCs) picked as analysis model parameters and designated as golden DTCs for the vehicle, and wherein the first condition is met upon the scan data matching one of a set of defined combinations of: a golden DTC for the vehicle, a corresponding diagnostic code type, and a corresponding module identifier.

19. The non-transitory computer-readable medium of claim 18, wherein the second class of rules is created based on an analysis of repair data.

20. The non-transitory computer-readable medium of claim 18, wherein diagnostic trouble codes for a vehicle are classified as Golden DTCs using a machine learning model.

* * * * *